Feb. 24, 1959  T. HENSE  2,874,634
PRINTING APPARATUS
Filed Feb. 14, 1957  12 Sheets-Sheet 1
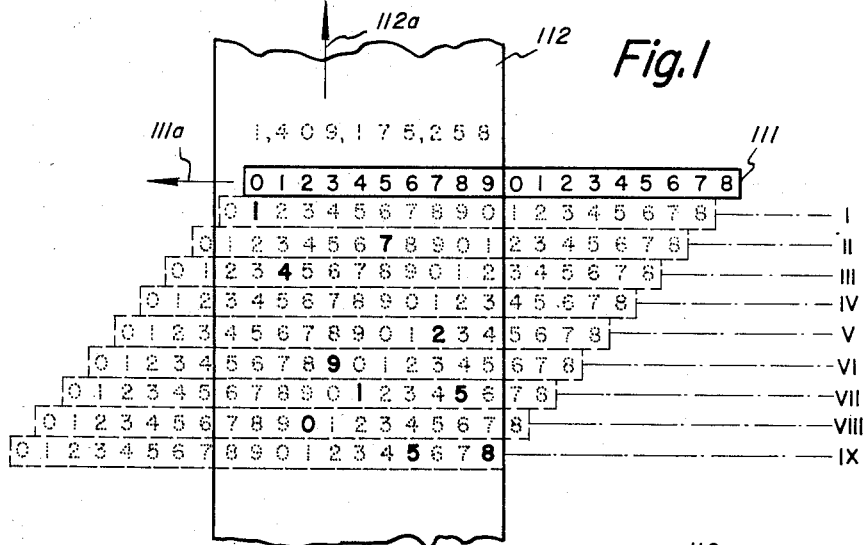
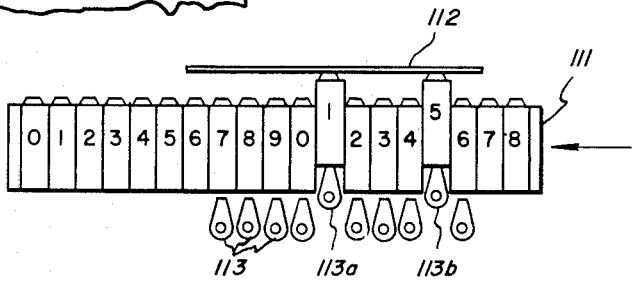
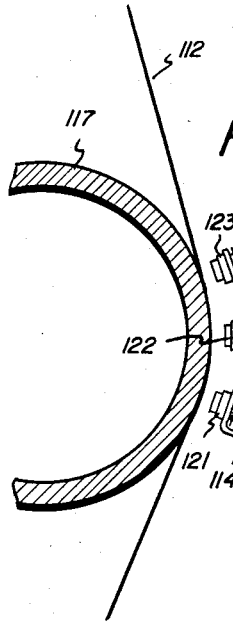
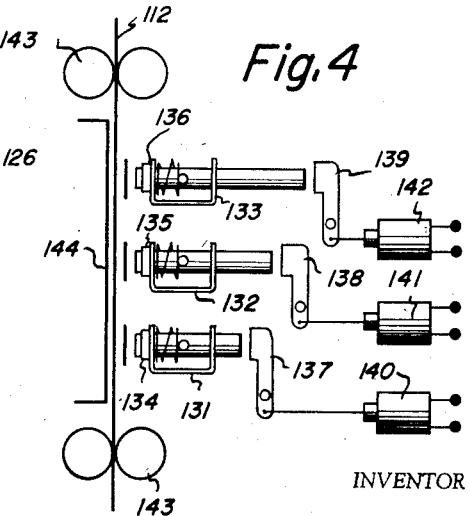
INVENTOR
THEO HENSE
BY Toulmin & Toulmin
ATTORNEYS Feb. 24, 1959 T. HENSE 2,874,634
PRINTING APPARATUS
Filed Feb. 14, 1957 12 Sheets-Sheet 4
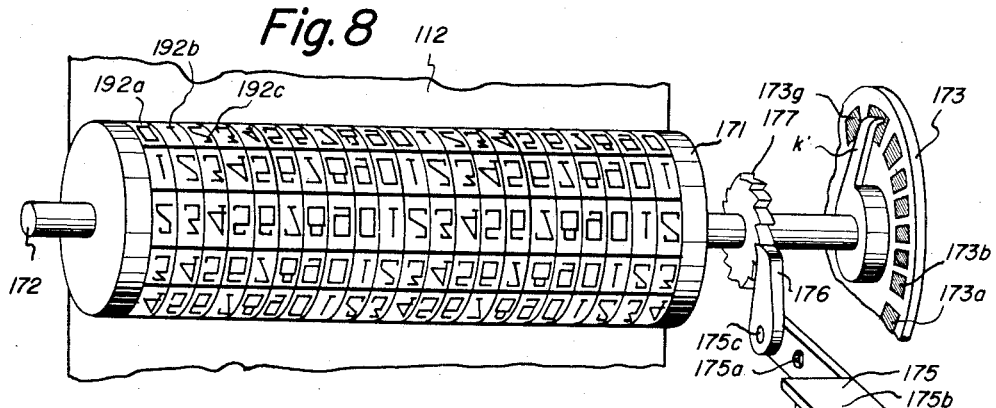
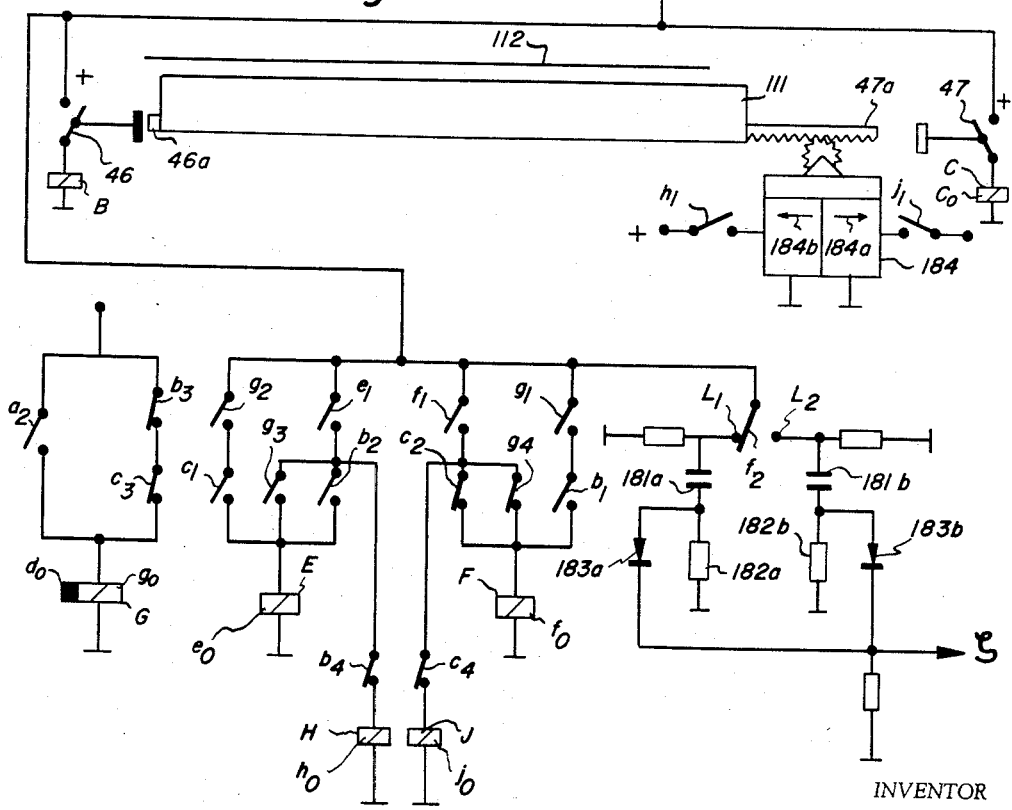
INVENTOR
THEO HENSE
BY Toulmin & Toulmin
ATTORNEYS

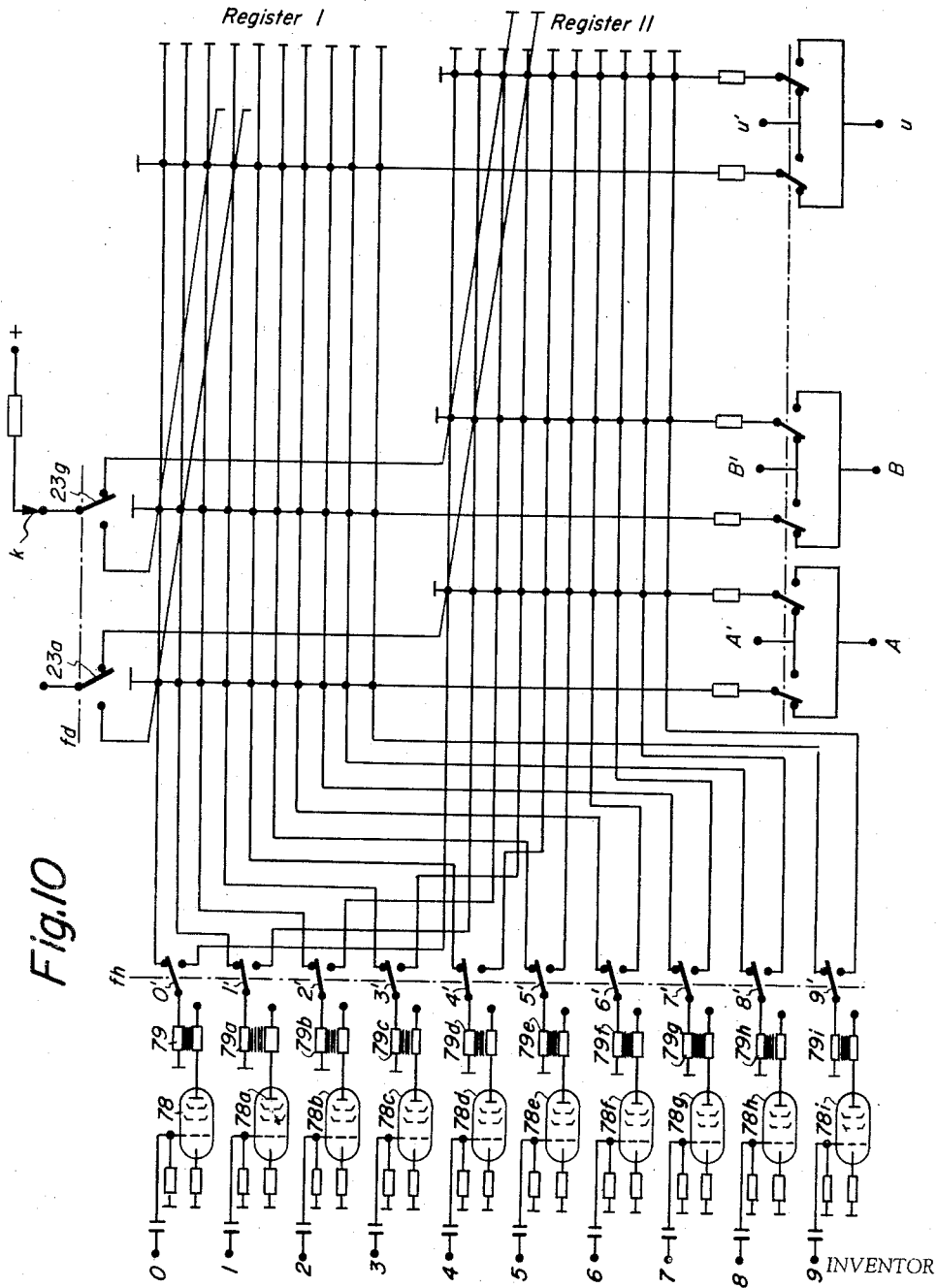

Feb. 24, 1959

T. HENSE 2,874,634

PRINTING APPARATUS

Filed Feb. 14, 1957

INVENTOR
THEO HENSE

Taulmin & Taulmin

ATTORNEYS

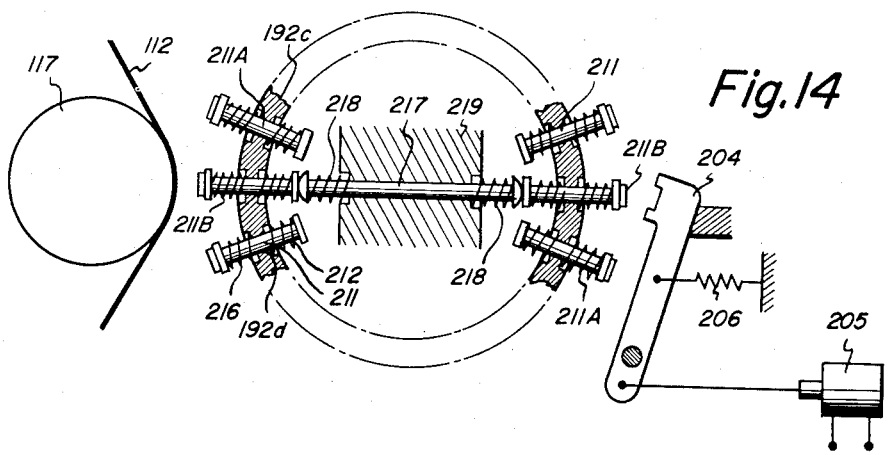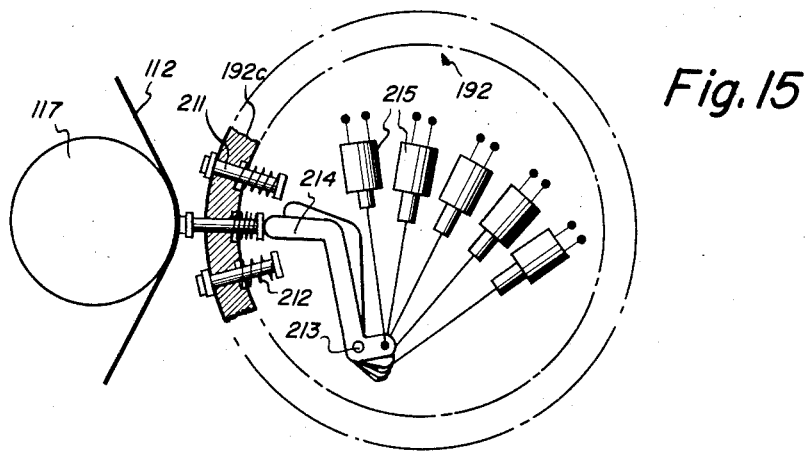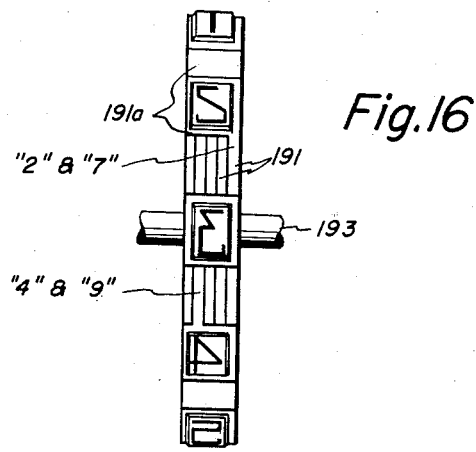

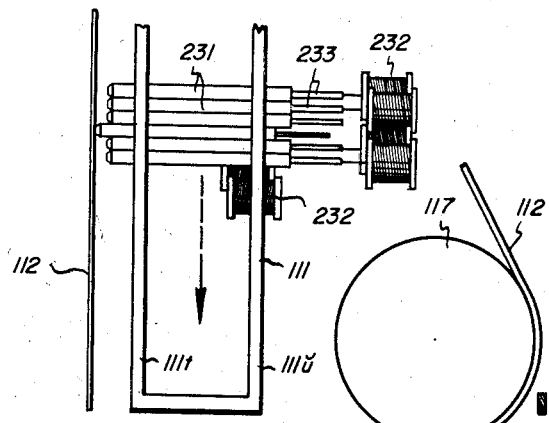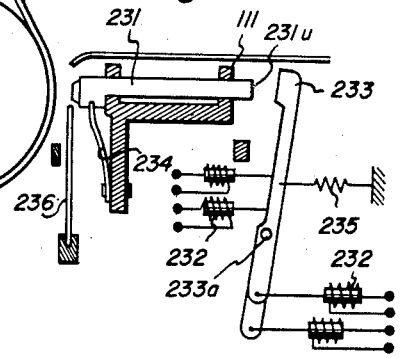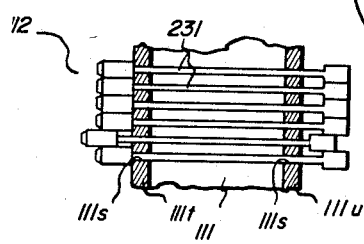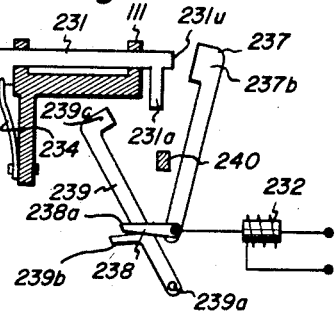

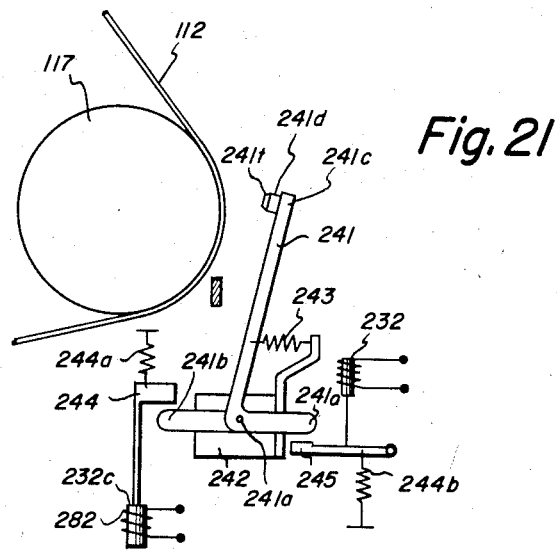
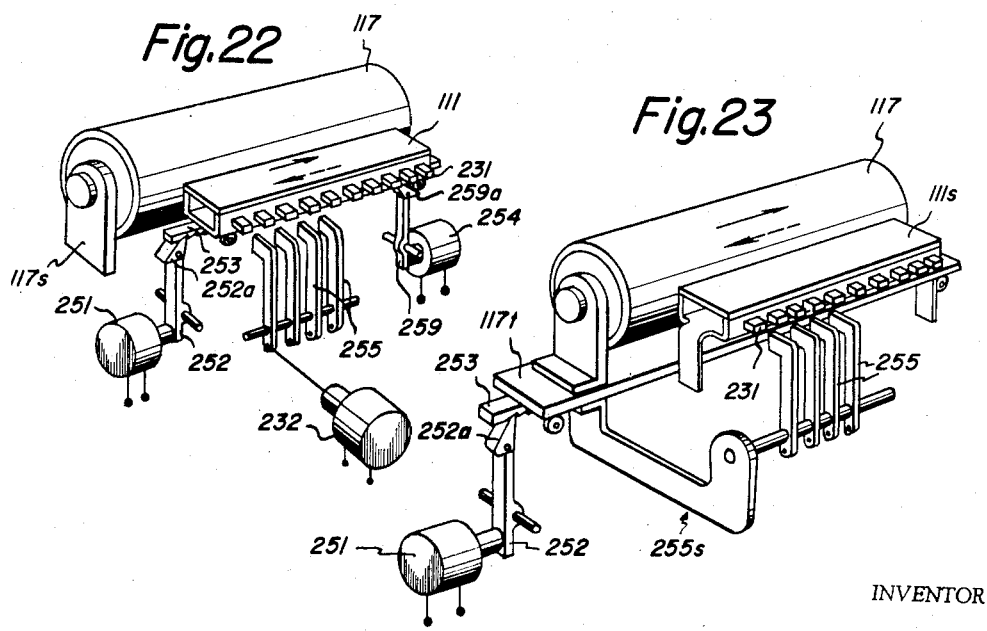

Feb. 24, 1959   T. HENSE   2,874,634
PRINTING APPARATUS
Filed Feb. 14, 1957
12 Sheets-Sheet 11
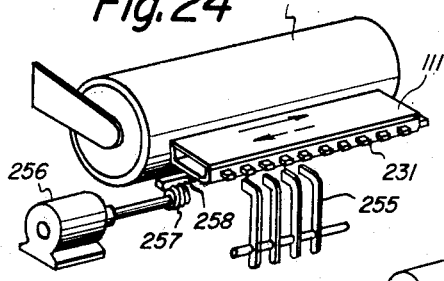
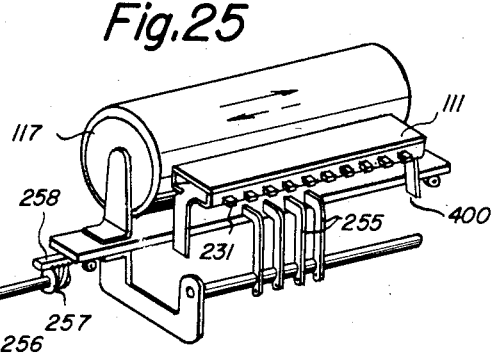
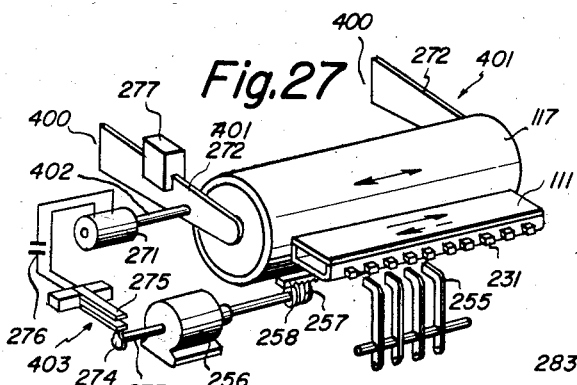
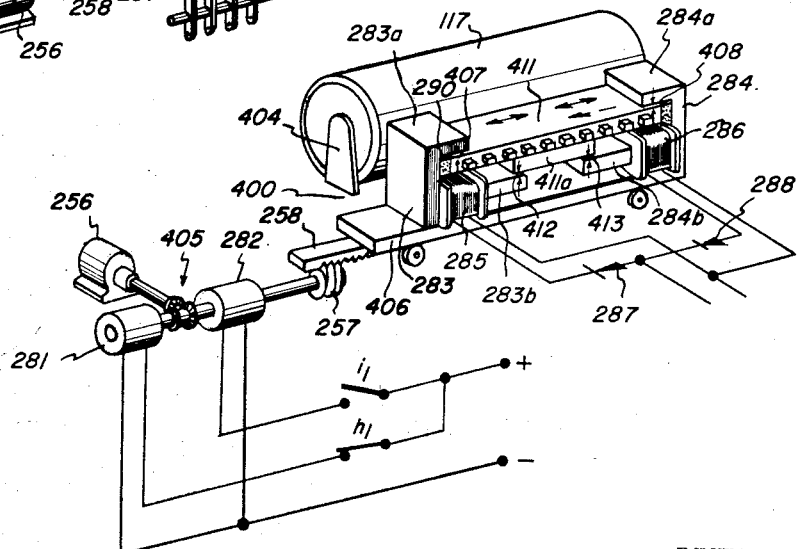
INVENTOR
THEO HENSE
BY *Taulmin & Taulmin*
ATTORNEYS Feb. 24, 1959  T. HENSE  2,874,634
PRINTING APPARATUS
Filed Feb. 14, 1957
12 Sheets-Sheet 12

INVENTOR
THEO HENSE
BY Toulmin & Toulmin
ATTORNEYS

United States Patent Office 2,874,634
Patented Feb. 24, 1959

2,874,634

PRINTING APPARATUS

Theo Hense, Wilhelmshaven, Germany, assignor to Olympia Werke A. G., Wilhelmshaven, Germany Application February 14, 1957, Serial No. 640,102

Claims priority, application Germany February 14, 1956

28 Claims. (Cl. 101—93)

This invention relates to printing apparatus controlled by a storage register in which information to be printed has been stored. The invention relates more particularly to printing apparatus of the aforesaid kind in which the types to be printed are selected during a relative motion between a set of types on the one hand and a surface to be printed on, on the other hand.

The aforesaid kinds of printing apparatus are preferably used with mechanical or electrical digital computing devices, several kinds of which are, for instance, listed in "High Speed Computing Devices" (HSCD), by Research Engineer Associates, published in 1950 by McGraw-Hill Book Company, pages 182 to 222.

When using a printing apparatus according to the invention with a computer of the aforesaid kind, a command transfer device must be interposed therebetween. A particularly suitable device for use with the present printing apparatus is described in my co-pending patent application, Serial Number 640,282, filed February 14, 1957.

It is an object of my invention to provide a printing apparatus enabling printing with an individual set of types at speeds considerably higher than those attained with the individual sets of known apparatus.

It is another object of the invention to provide for a printing apparatus allowing for a comparatively noiseless operation.

It is still another object of the invention to provide for a high speed printing apparatus with which several copies of the printed text can easily be made. It is yet another object of the invention to provide for a high speed printing unit with which copies can be made by flat printing.

It is a further object of the invention to provide for a printing unit that is of simple construction and comparatively small size.

It is a still further object of the invention to provide a printing apparatus having type sets, each of which can be displaced in a straight line parallel to the direction of the lines in the finished print, the print of each line being flat, thereby not requiring any curvature of the paper transverse to the feeding direction of the latter, if the paper is fed at right angle to the direction of displacement of the line type sets.

It is a further object of the invention to provide a printing apparatus of the kind described, which permits to obtain numerous copies of a printed text simultaneously with printing the same, in flat print.

It is finally an object of my invention to provide a printing apparatus of the kind described, in which the masses of parts to be displaced in the printing apparatus proper are so reduced that the forces required for driving these parts, the noise during operation, and the moving distances of parts during the type selection etc. are greatly reduced, thereby contributing to a high printing speed of up to 1200 lines per minute for each individual type set.

Printing apparatus are well known in the art, wherein the placement of the types, bearing the characters to be selected, is effected by means of slidable or rotatable type carriers. The most widely used printing apparatus have a plurality of type carriers corresponding to the number of indices (type positions) making a text line. Each type carrier bears all the individual type characters used in printing and can be selected independently from the other type carriers. It is a drawback of this arrangement that the placement of the type carriers as well as the printing of the selected indices requires acceleration of a comparatively heavy mass. Consequently, a great amount of energy is used for driving the apparatus. In addition, the operation of this machine is very noisy.

According to a different type of construction similar to that of a typewriter, the selection of the character to be printed at any given moment is effected during the relative displacement of the type carrier on the one hand and the printing surface on the other hand. In this type of apparatus as it is, for instance, described in Patent 2,692,551 to J. T. Potter, only a single drum or type wheel is required. On this type wheel, the character bearing types are arranged so that the characters are disposed upright adjacent each other to form a row as in a text line, which row or type set contains at least one type of each different character, the row being arranged circumferentially about the wheel. However, even at a modest writing speed, a high number of revolutions of the type carrier is required. Moreover, the printing paper must be of a special kind adapted to the curvature of the type wheel and hence requires complicated guidance and feeding of the paper and the ink tape. Also, the paper is usually hit by hammers mounted on the side of the paper facing away from the types which are to make an imprint on the paper. This calls for a very complicated and cumbersome construction. It is also difficult to make copies of the print. The entire apparatus occupies a relatively large space.

All known printing units allow for a moderate writing speed of, for instance, 250 to 300 lines per minute per type set only. This speed is restricted by the inherent limitations of the system for construction of the known machines, and the limitations imposed by a tolerable degree of operating noise.

Furthermore, printing apparatus have been described, for instance, in the patents to Zenner 2,505,729 and to Nilson 2,708,218 which apparatus comprise a rectangular type box containing the entire set of type characters required for printing a text, arranged in several rows and columns in the box. In order to bring a character bearing type in the box into printing position, the box must be shifted horizontally as well as vertically from a given zero placement to which the box is returned after each print stroke. This requires a complicated horizontal and elevational displacement of the entire box back and forth to a given zero position, although the box may be subdivided into a plurality of cases each having a zero position so as to somewhat shorten the length of sidewise and up and down travel of the box.

The above-stated objects are attained and the drawbacks of the known apparatus described hereinbefore are avoided by the printing apparatus according to my invention which is characterized, as a main feature, by a type carrier bearing, in a planar longitudinally extending row, one or several complete sets of all the different type characters to be used for printing. This row of types extends in a substantially straight line parallel to the line of print to be made on the paper, and which is further characterized, as another main feature, by the individual straight line set of types being coordinated with type actuating means such as hammers, and adapted to print complete lines on a paper surface which is straight, i. e. not curved or bent in the direction in which the type set and concurrently therewith the text line to be printed, extends.

According to another feature of the invention, the type driving means are, in turn, actuated in such a manner that they strike at least one, or simultaneously several, types in a given position of an individual type set relative to the printing surface, and continue striking one or several types in successive positions of the type set relative to the surface to be printed on, so that a number or letter sequence forming one line of the text is printed, the amount of the relative distance of displacement between the paper and the type set being generally equal to the product of the number of different types minus one, multiplied by the distance of the types from each other, this condition being the same for either direction of rectilinear movement of the type set and the paper surface relative to each other.

"Numbers" as used in this specification comprise any group of characters representing a sequence of letters, figures, punctuation signs and other symbols generally required for printing, and arranged, usually, in one line of text.

According to one embodiment of the invention, the aforesaid principle of arranging the paper and type set can be put into practice by arranging, in or on a suitable frame or other support such as a drum, several of these individual line type sets in parallel, one above the other.

During the printing operation, one of these line type sets such as, for instance, the lowermost one in a frame, may be caused to carry out a determined partial printing of a stored line text, whereupon either the paper or the type set carrier, frame or drum, may be switched, in a direction preferably at right angle to the extension of the text line, so that the next following type set may carry out the printing of another line or partial line of the stored text information, since some of the type sets may contain types bearing letters, and other types bearing ciphers, the versatility of the printing apparatus in practical use is greatly enhanced.

It follows from the aforegoing that all essential feature of the invention resides in a relative displacement between an individual type set and the surface to be covered with print, which displacement brings about an uninterruptedly successive new placement of the types in the set relative to the text line being printed on the printing surface, together with a control of the printing operation.

It is, in this respect, principally immaterial whether the relative displacement is brought about by a movement of the type set or type set carrier past a stationary printing surface, or whether the printing surface, for instance, the paper to be covered with print, is moved past a stationary type set or type set carrier.

The relative displacement may be stepwise, a type space at a time, across the width of the printing surface, or it may be continuous, or continuous with a superimposed (modulated) oscillating motion of one or the other of the two printing members (paper and type set) partaking in the printing operation, in the direction of the continuous movement of the other, thereby assuring that, at the moment of making the imprint on the paper, there is no relative movement between them and avoiding smearing of the printed characters.

According to a particularly simple embodiment of the printing apparatus of my invention, an individual type set may be mounted in a type carrier consisting of a straight bar frame which is moved a space a time past the printing surface, and in which the types or type levers are mounted slidingly or on a shaft about which they can be swivelled.

According to another embodiment of my invention, straight line type sets may be arranged on a drum shaped type carrier in such a manner that the cylinder wall of the drum bears, parallel to the drum shaft, a plurality of straight line type rows, the characters in which are arranged displaced by one type character and by one type width relative to corresponding characters in the type rows next adjacent the former, each row parallel to the shaft of the drum comprising at least one complete type set.

In this embodiment, a continuous or step by step rotation of the type set bearing drum will have the effect of causing a displacement of the sequence of type characters in the direction of the printing line, which is the equivalent of the effect brought about by a relative displacement between a straight bar type set carrier and the printing service in the direction of a printing line.

According to a further feature of my invention, the printing apparatus comprises a scanning device which is adjustable for operation dependent upon the relative movement between the type carrier and the printing surface. This scanning device serves for scanning a mechanical, electrical or magnetic storage register of the type described in my co-pending patent application supra.

The information to be printed, which is stored in this register, is detected by the aforesaid scanning device, which scans all addresses of the aforesaid storage register in each successive printing position (placement) of the type carrier for those indices which correspond to the type characters facing the type driving means in the successive positions adopted by the character types of a set vis-a-vis the former.

The matrix register from which the stored information is to be derived for printing by detecting the available information by means of the aforesaid scanning device may be a magnetic register receiving the information to be stored from a keyboard, from the output side of a computing or writing device, such as a teletypewriter, or from a punched card hole verifier and the like devices. Magnetic registers of this kind are described, for instance, in HSCD supra, pages 40–43. Each matrix of the magnetic register is determined by its line and its column.

The numbers, digits or indices can be detected by scanning successive rows (lines or columns) of those matrix register elements which correspond to those character types being in printing position and, consequently, to the register portions such as loading circuits or loops which correspond to these character types.

Mechanical or electrical means are provided for actuating the type driving means coordinated with the corresponding character types in a type set whenever a value detected among the register elements by the aforesaid scanning means, is to be reproduced.

The combination of a printing apparatus according to my present invention with a magnetic matrix register which requires only an extremely short information storing and reproducing times, offers special advantages, the aforesaid kind of register being particularly well suited for the high printing speeds of the printing apparatus according to my invention.

If several magnetic registers are combined in a command transfer system of the kind described in my co-pending application supra, each of which registers can be alternately connected to the printing apparatus of the present invention or to a high speed computing device, or the like, it is possible to load one register, temporarily disconnected from the printing apparatus, with new information, while printing the information contained in the other register, so that no delays are caused between storage and printing of information.

The data to be scanned may have been stored previously in the above-mentioned matrix register by means of, for instance, a keyboard, the output side of a computing or writing device, a punched card scanning device or the like. Matrix registers which are magnetic registers, have, for instance, been described in "New "Ferrite-Core Memory Uses Pulse Transformers" by N. W. Papian "Electronics," March 1955, pages 194–197; and "A Myriabit Magnetic-Core Matrix Memory" by Jan A. Rachman "Proceedings of the I. R. E.," October 1953, pages 1407–1421.

The invention will be better understood by the description thereof, in detail, in connection with the accompanying drawings in which Figure 1 schemactically illustrates, by way of example, at the hand of a given number, the process of printing with a printing apparatus according to the invention, comprising printing positions I–IX;

Figure 2 illustrates schematically a type set and type actuating means of the printing apparatus according to the invention, in the position of printing corresponding to VII in Figure 1;

Figure 3 illustrates one embodiment of the printing apparatus according to the invention, comprising several type carriers arranged facing a writing cylinder;

Figure 4 shows a printing apparatus having several type carriers in an arrangement for printing on a flat surface;

Figure 8 illustrates a drum-shaped type carrier having a drum drive and a pre-selector device provided therewith;

Figure 9 is a schematic view of relay means controlled, in its end position, by a horizontally displaceable type set carrier according to the invention;

Figure 10 shows an arrangement of the loading and scanning relay switch means associated with two matrix registers;

Figure 14 shows an arrangement of the types in the wall of the cylinder illustrated in Figure 8, comprising further details of the type actuating mechanism;

Figure 15 shows an arrangement of the types in the wall of the cylinder illustrated in Figure 8, comprising type actuating means provided in the interior of the cylinder;

Figure 16 is a fractional view of details of the arrangement illustrated in Figure 12;

Figure 17 is a top view of an arrangement, by way of example, of type hammers and actuating magnets associated with a horizontally displaceable type carrier;

Figure 18 is a cross sectional view of the type actuating mechanism illustrated in Figure 17;

Figure 19 illustrates in a partially sectional view, by way of example, the bearing means supporting the individually guided type rods in a type carrier as illustrated in Figures 17 and 18;

Figure 20 illustrates a type actuating mechanism according to the invention, comprising retractable hammers;

Figure 21 illustrates a type carrier having types mounted on fly levers;

Figure 22 illustrates, in perspective view and by way of example, an arrangement, according to the invention, of a type set carrier being adapted for step by step displacement in its longitudinal direction relative to a stationary printing surface;

Figure 23 illustrates, in perspective view, an arrangement, according to the invention, of a stationary type set carrier and a printing surface provided with means for displacing the printing surface in a continuous manner relative to the aforesaid carrier;

Figure 24 illustrates, in perspective view, the arrangement, according to the invention, of a type set carrier to be displaced in a continuous motion, relative to a stationary printing surface;

Figure 25 shows, in perspective view, a printing surface provided with means for continuous displacement thereof in either direction of its longitudinal extension, relative to a stationary type set carrier;

Figure 27 shows a perspective view of an arrangement, according to the invention, comprising a type set carrier which is continuously displaceable in either longitudinal direction, and a printing surface provided with means for oscillating the same in longitudinal direction;

Figure 28 is a perspective view of an arrangement, according to the invention, comprising a stationary printing surface, and a type set carrier adapted for continuous motion in either direction of its longitudinal extension, and for an additional oscillatory motion;

Figure 5:
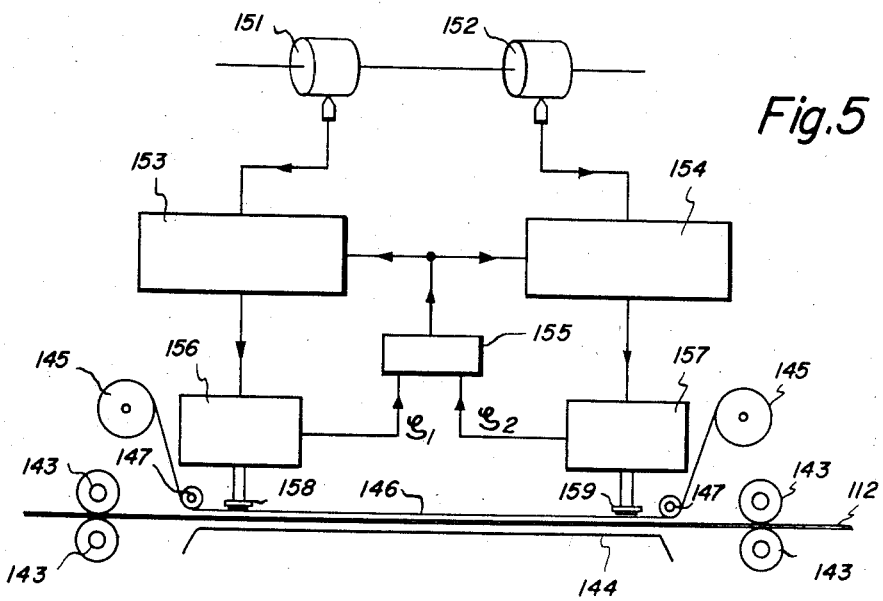
Figure 5 represents a block diagram for operating a printing machine comprising several type set carriers.

These figures of the drawings shall be explained in detail hereinafter:

The printing system

In order to describe the principles on which the construction of the printing apparatus, according to the invention, is based, there is illustrated in Figure 1 a practical example of how relative motion between a type set carrier and a printing surface is effected. In Figure 1, reference numeral 111 designates a frame-shaped type set carrier which is displaceable in the direction of the text lines to be printed, and which contains, in a straight row, a first type set from 0 to 9, and a second type set from 0 to 8.

In the present example, the number 1,409,175,258 is to be printed on the printing surface 112, the aforesaid number being, for instance, the result of a calculation carried out by a high speed computing device. From its starting position, type set carrier 111 is advanced step by step in a direction at right angle to the paper web or similar material bearing the printing surface 112. Since the printing surface also carries out a displacement in the direction of arrow 112a intermediate each displacement step carried out by type carrier 111 in the direction of arrow 111a, the latter adapts positions I to IX during each successive printing step.

In the initial position of the type set carrier 111, none of the types borne by the same is placed in a printing position for printing the above-mentioned number, a fact which is easily confirmed by comparison with the position of the ciphers forming that number which is indicated on the printing surface in dotted figures above the starting position of type set carrier 111.

The latter then carries out the first step, being displaced to the left in the direction of the text line to be printed. It thereby arrives at position I indicated by dashed lines. Consequently, the first type "1" on the type set carrier has been moved in a position corresponding to that of the first cipher "1" in the number to be printed, at which position this type is caused, in a manner to be described further below, to print the figure 1 on the paper. This is indicated in Figure 1 by fat print.

After printing cipher "1," type set carrier 111 moves another step to the left, whereby it adopts position II, in which type "7" registers with cipher "7" in the number to be printed and printing of this cipher is effected. The further steps III to IX lead to the printing of figures as indicated:

| Position | |
|---|---|
| Position III | 4 |
| Position IV | No printing |
| Position V | 2 |
| Position VI | 9 |
| Position VII | 1 and 5 simultaneously |
| Position VIII | 0 |
| Position IX | 5 and 8 simultaneously |

Thus, after nine steps, carried out by the type set carrier, the entire number which comprises ten digits or positions, has been printed.

As will be understood from the above explanation, a number having a determined amount of digits or positions can be printed in nine steps carried out by a straight lined type carrier, if the latter contains a corresponding amount of repetitions of the ciphers forming each type set. Generally speaking, the printing of $x$ different types requires maximally $x-1$ steps, i. e. in the case of printing ciphers comprising the ten types from 0 to 9, the maximum number of nine steps are required.

In the case of printing the English alphabet requiring 26 different types, the number of steps maximally required to print a line of the English text is 25, of course, the number of steps may be less, but never more.

In office printing machines the type width is usually about 2.6 millimeters, the printing of a number will require a lateral displacement of the type set carrier 111 by about 23 millimeters. If other characters are to be printed, the moving distance of the type set carrier will be increased beyond the aforesaid figure only by the number of these different characters to be added to each type set, minus the last character in the set, and multiplied with the type width.

Thus, the same principle on which the construction of the printing apparatus according to my invention is based, can also be applied to the printing of texts, or the printing of combinations of text and figures.

If texts are to be printed in types of the kind used in typewriting, and comprising all characters including capitalized letters, punctuations and ciphers, about 92 types each having a width of 2.6 millimeters will be required which would necessitate a type carrier having a length of about 440 millimeters and adapted to move a distance of 236.6 millimeters, if the printing surface is represented by a standard letter size typewriter paper.

In Figure 2 the same type set carrier 111 as in Figure 1 is shown in a schematic top view facing the printing surface 112, and a set of hammers 113 is shown arranged on the opposite side of the types facing the printing surface. Figure 2 illustrates the printing position VII of Figure 1 in which types "1" and "5" of the second type set are being actuated by hammers 113a and 113b. This Figure 2 also shows that hammers 113 are provided one for each digit or position on the printing surface 112 which may maximally receive a printed character, i. e. a hammer on one side of the type set carrier corresponds to each position that may be printed in a text line on the paper arranged at the opposite side of the type set.

Above the printing surface 112 in Figure 2, there is indicated the number used in the example of Figure 1, with digits already printed, in full lines, figures being printed in position VII shown in fat print, and digits still to be printed in subsequent positions VIII and IX shown in dotted line.

As a special variation, illustrated in Figure 3, type sets containing different character groups may be arranged in a plurality of straight lined type carriers 114, 115, and 116, arranged one above the other, and displaceable in a direction parallel to each other. The several type set carriers are preferably of even length. In this arrangement, the lowermost type set carrier 114 may print a certain amount of characters pertaining to the group forming its type set, into a line of text to be printed on the printing surface 112 which is supported on a writing cylinder 117, the line to be printed extending in a direction perpendicular to the plane of Figure 3. After the position of the line to be printed on paper 112 has been changed to a position in which that same text line faces printing set carrier 115, a further amount of characters from among the group contained in the second type set carrier 115, is being printed. Finally, after a further shifting of the text line position to where the same faces type set carrier 116, the remaining characters completing the respective text line, are being printed. Shifting of the text line can be effected by any conventional means, for instance, by the well known line-shifting means used for rotating the writing cylinder step by step in electric typewriters.

Each of the type set carriers 114, 115 and 116 is provided with the necessary type actuating means comprising, for instance, sets of hammers 118, 119 and 120 (of which hammer sets only the top one is shown) and which hammers strike against the rear ends of types forming type sets 121, 122 and 123, respectively. Again, in each of these type sets, which may be formed in the same manner as set 111, only the front type is visible in Figure 3. The type hammer sets 118, 119 and 120 may be actuated by magnet means 124, 125 and 126.

By an arrangement of character groups forming type sets mounted in a plurality of type carriers arranged one above the other as illustrated in Figure 3, the moving distance to be covered by each type set carrier during one printing operation may be shortened, if only two different type set carriers are used, from, for instance, the above-mentioned 236.6 millimeters to half that distance, i. e. 118.3 millimeters, the length of the character groups in each type set carrier amounting to approximately 320 millimeters.

If three instead of two type set carriers are used, as is the case in Figure 3, the moving distance of each carrier is further reduced.

Figure 4 shows schematically another arrangement of a printing apparatus according to the invention, which is applicable for flat printing. In this arrangement type set carriers 131, 132 and 133 are disposed one above the other and bear type sets 134, 135 and 136 which serve for printing on a printing surface 112 in a manner similar to that illustrated in Figure 3, but constituted by a paper web which is supported by a platen 144. The line by line displacement of the printing surface is effected with the aid of pairs of rollers 143 above and below the platen 144. The types are actuated by hammer sets 137, 138 and 139 which are, in turn, operated by magnetic means 140, 141 and 142. In this arrangement, the above mentioned 92 "numbers" characters may, for instance, be distributed in groups of 23 over four type set carriers.

With the arrangement shown in Figure 4, a text line is printed by first printing certain characters contained in the type set of, for instance, type set carrier 131, then displacing the paper web 112 to align the text line being printed with type set carrier 132, printing another selection of characters from type set 135 in the text line, displacing the same again upwardly to face type set carrier 133 and then completing the printing of that text line with characters contained in type set 136.

It is also possible to provide only a single set of hammers and magnetic means in Figure 4, for instance, hammer set 138 and magnetic means 141, and raising type set carrier 131 and lowering type set carrier 133 to the level of type set carrier 132 while retaining the level of the text line to be printed on surface 112 constant at that of hammer set 138 during the three steps of the printing operation.

Naturally, while type set 134 prints a first text line, type set 135 may simultaneously be used to type certain characters of a second text line, and type set 136 for printing certain characters of a third text line. The printing of the first text line will only be completed after two line shifts, i. e. after the remaining characters of the line have been printed from type sets 135 and 136.

The arrangement illustrated in Figure 5 shows schematically how two printing devices 156 and 157, each comprising at least one type set carrier 158 and 159 respectively, are coordinated to print on a printing surface 112 which is displaced line by line through pairs of rollers 143 and supported on a flat bed or platen 144. Ink is fed to the types by means of a ribbon or tape 146 fed between rollers 145 past guide rollers 147. The two printing devices 156 and 157 are connected in the manner illustrated in Figure 5 to two magnetic storage registers 151 and 152 which may be drum-shaped and are, for instance, mentioned as part of computing devices in my copending application supra. These recording means are connected each to a command transfer apparatus 153, 154 of the type described in my copending application supra. These command transfer systems are each connected in the manner described in the aforesaid copending application to a printing device 156 and 157. Furthermore, there is provided a coincidence device 155 which receives the command pulses $\xi_1$ and $\xi_2$ conveying the message that printing in either printing device 156 or 157 has been terminated. The coincidence device 155 is further connected to both command transfer systems 153 and 154 to transmit to both systems simultaneously a command pulse conveying the message that printing in both printing devices has been terminated. This prevents printing of a new text in one of the printing devices 156 or 157 before the second device has also terminated the text which is currently being printed.

Only after both pulses $\xi_1$ and $\xi_2$ have arrived at the coincidence device 152, does the latter inform the two command transfer systems 153 and 154, that printing by both devices 156 and 157 has been terminated, and that consequently a new text may be started.

As a further important feature of the invention, since the return movement of the type carrier, for instance, 111 in Figure 1, from the final position IX to the starting position, causes passage of all types in the carrier through the same decimal positions as in the forward movement of the carrier past the printing surface, it is immaterial whether printing of a specific text line takes place during the forward movement of the type set carrier, i. e. from right to left in the example of Figure 1 or during the return movement of the type set carrier from left to right. Consequently, it is not necessary to return the type set carrier from position IX to the starting position in Figure 1 before printing the next following line but, naturally after a line shift between the printing surface 112 and the type set carrier in upward or downward direction has taken place, the next following line may be printed following the return movement of the type set carrier. This leads to a further shortening of the time required for printing the entire text.

*Cooperation between storage means and printing apparatus*

Figure 6:
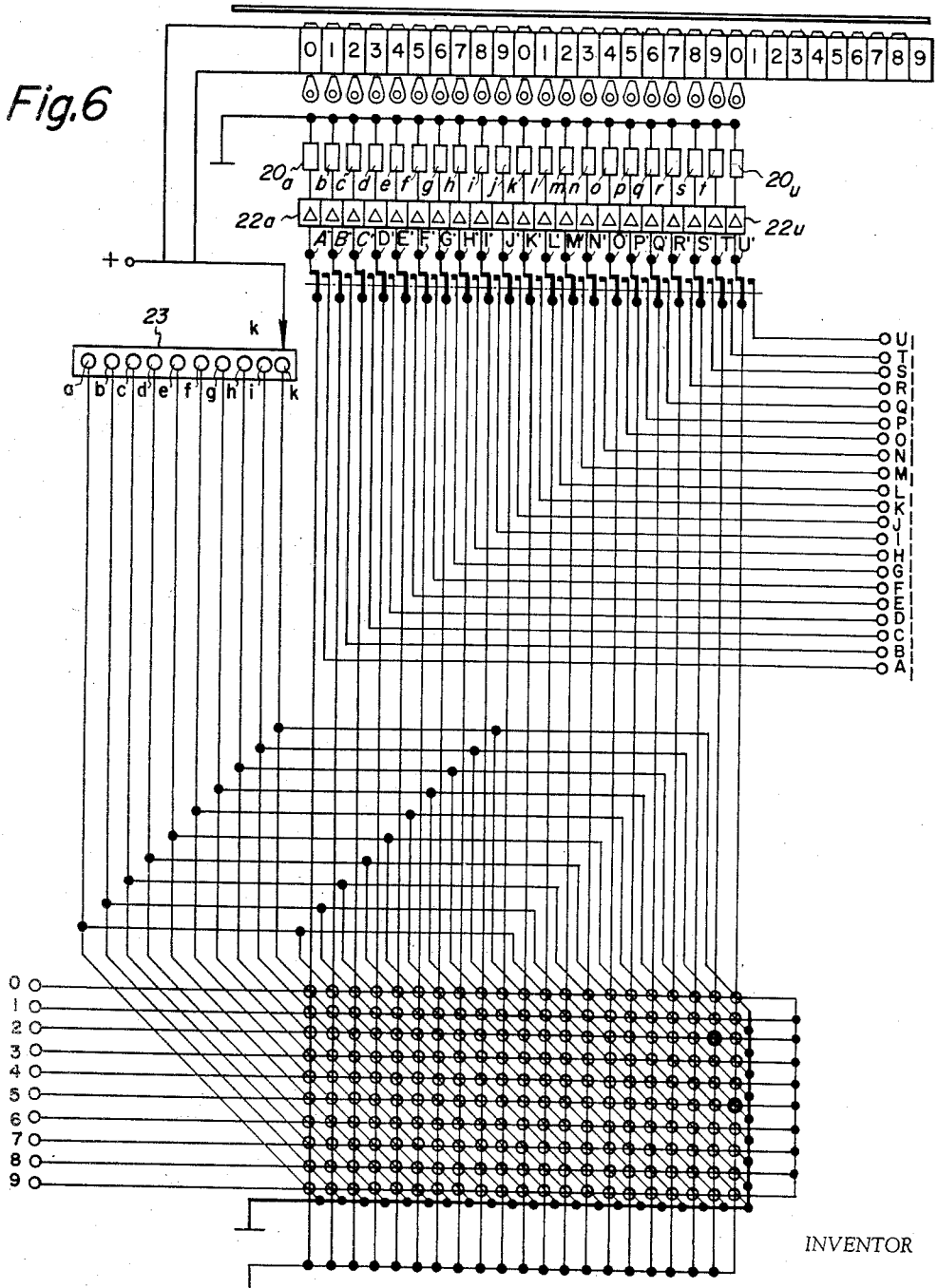
Figure 6 illustrates a type set displaceable in the direction of the text lines, and provided with a magnetic matrix register and type actuating means.

A basic wiring diagram for connecting a printing apparatus, according to the present invention, adapted for printing a text line having 21 digits or positions, to a magnetic matrix register 161 of the kind described in my copending application supra, is illustrated in Figure 6, and further details of the connecting means are shown in Figures 7, 8, 9 and 10. The 21-position printing device comprises a horizontally displaceable type carrier 111 containing three type sets bearing the characters 0 to 9 in a row. Figure 6 shows this type set carrier in its end position to the right, from which it can be moved step by step to the left. In the shown end position, the first twenty-one types of type set carrier 111 face a hammer set 167a to 167u, which is associated with hammer actuating magnets 20a to 20u. Each of these magnets can be excited by way of a respective current gate 21a to 21u (shown in detail in Figure 7), each gate being combined with an amplifier 22a to 22u. The agitation of one, or of several of the magnets simultaneously is only possible if the relay switch $f_v$ is shifted to a position in which it connects the vertical loops 162a to 162u of the matrix register to the input sides A' to U' of amplifiers 22a to 22u. A contactor K is rigidly connected to type carrier 111 and is provided with a lead 111p from a source of positive potential, and a contact point or slide $K_a$ which slides along a contact rail 23 bearing contactors 23a to 23k to which there are connected diagonal loops 163a to 163k of the matrix register 161. This matrix register further comprises, in a conventional manner, horizontal loops 164a to 164k serving for the storage of figures to be loaded, and being connected to register entrance terminals 0 to 9 via amplifier tubes 78 to 78i and pulse transformers 79 to 79i as well as relay switch means $f_h$ (0' to 9') as illustrated in detail in Figure 10. It also comprises vertical loops 162a to 162u which are connected to switch means $f_v$ which will be described further below.

Let us assume that type set carrier 111 (in Figure 6) is in the position illustrated in that figure of the drawings.

Scanning contactor K is then with its contact point $K_a$ making contact with contact terminal 23k, i. e. the potential applied via contactor K effects a current flow in diagonal loop 163k. However, since this diagonal loop is not connected to any magnetic intersection in which a digit is stored, i. e. which is in a reversible state of saturation, no voltage is induced in any one of the vertical loops 162a to 162u and, consequently the printing apparatus remains inactive. This is also the case during the first and second step by step advancement of the type set carrier 111 to the left in Figure 6, during which steps scanning contactor point $K_a$ makes contact with contactors 23i and 23h successively. Only after the third step of type set carrier 111 does contact point $K_a$ close contact 23g and cause a current to flow into diagonal loop 163g wherein there has been stored a digit at the intersection 165 of vertical loop 162t and horizontal loop 164c, and there is brought about a magnetic reversal of the ring core 165. Thereby, an induction potential is generated in the vertical loop 162t, which fires the current gate 22t, and excites the printing magnet 20t, whereby the hammer 167t hits against the type "2" opposing the same which causes the type to print the decimal cipher 2 on the paper web 112. With the next following step of the type carrier 111, contact point $K_a$ scans contactor 23f and the current flowing through the diagonal loop pertaining thereto, cannot demagnetize any of the magnet cores in that loop 163f, because no digit has been stored in any of them. At the next following step of the type set carrier, however, contact point $K_a$ makes contact with contact terminal 23c which leads to the demagnetization of intersection 166 and consequently to a potential being induced in the vertical loop 162u corresponding to the decimal value "5," which leads in turn to the firing of current gate 22u and actuation of magnet 20u and hammer 167u, whereby the type then confronting the last named hammer is caused to print the cipher "5" on the printing surface 112 at the position to the right of the first printed cipher "2."

It will be easily understood that further digits stored in the matrix register 161 will be printed during the successive stepwise displacement of the type set carrier in the manner illustrated in Figure 1, either successively or simultaneously.

If, for instance, contact is made after the next following step, i. e. the sixth step to the left from the starting position illustrated in Figure 6, and current is thereby sent into the diagonal loop 163d connected to conductor 23d, this current will demagnetize simultaneously digit "3" stored at the intersection of vertical loop 162h and horizontal loop 164d and digit "6" stored at the intersection of vertical loop 162k and horizontal loop 164g, thus causing the simultaneous printing of both figures "3" and "6" on the paper web 112.

In an analogous manner, the registration and printing of a number may be carried out when a rotatable type set carrier 171 as illustrated in Figure 8 is used.

This type set carrier 171 is drum-shaped and provided with twenty-one type rings arranged adjacent each other about the type set cylinder, each type ring bearing the types 0 to 9. By the displacement of each next following ring relative to the preceding one which corresponds to the next preceding decadic position by one type each time, a plurality of axially parallel type lines is obtained, each of which lines contains at least one set of the types 0 to 9 always displaced by one cipher relative to the next adjacent parallel line above and below each line. By rotation, either stepwise or continuous, of the drum cylinder 171 carrying this arrangement about the shaft 172 it is achieved that the type sequence facing the printing surface 112 is progressively moving in either direction parallel to the direction in which the type lines extend. This is in effect the equivalent of a relative displacement of a type set carrier vis-a-vis a printing surface in the direction of line extension. This permits in effect that, if necessary, neither the type set carrier nor the printing surface carry out an actual displacement in the direction of text line extension, while, nevertheless, the basic method of printing, according to the present invention, can still be applied in practice.

The functional connection arrangement between a rotatable type set carrier 171 with the scanning device for scanning a storage register in the manner just explained at the hand of Figure 6, is also shown in Figure 8.

Instead of the contact arm K which is horizontally displaceable together with the straight bar type set carrier 111 illustrated in Figure 6, the arrangement shown in Figure 8 comprises a contact arm K' which is rigidly mounted on the shaft 172 so as to rotate together with the same, and scan contactor plates 173a to 173k which are peripherally arranged on the stationary contactor disc or shield 173. Each of these contactor plates is connected to one of the diagonal loops 163a to 163k of the matrix register 161. In other words, the contactor terminals 23a to 23k are now arranged in a circle as contactor plates 173a to 173k. The step by step rotation of the drum-shaped carrier 171 can, for instance, be effected by means of a ratchet wheel 177 and a pawl 176. The latter is actuated by an electro magnet 174 and a rocker lever 175 mounted on pivot 175a and bearing at its one end a contact plate 175b cooperating with the core of electro magnet 174 while, on the other free end of lever 175, the pawl 176 is mounted on pin 175c. The switching pulses for actuating the magnet-lever-pawl-ratchet wheel arrangement are derived, for instance, from an electromechanical or electronic vibrator of known construction which is schematically indicated in Figure 8.

The matrix register 161 is scanned and the printing apparatus set in operation in the same manner as described at the hand of Figure 6, rotation of drum 171 by one line step, i. e., for instance, moving contactor K' from contact terminal 173a to 173b etc., causing one or several number types of a horizontally extending line to be printed, the text line extending, of course, parallel to the drum shaft 172. The actuation of the types carrying the various characters of a type set, will be described in more detail further below.

Instead of using mechanical contact means for scanning the contact terminals of the diagonal loops (either Figure 6 or Figure 8), it is also possible to use electronic or photoelectric scanning means all of which are well known in the art of scanning devices.

Figure 7:
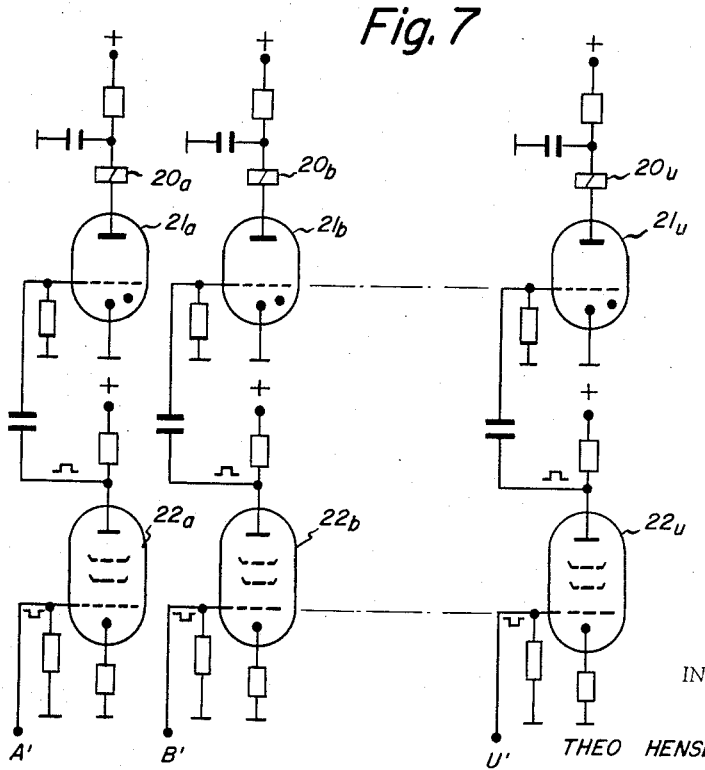
Figure 7 shows, by way of example, a gate circuit comprising an amplifier tube, to be used in the embodiment shown in Figure 6.

For instance, a ring counter of the kind illustrated in Figure 7 of my copending application supra, and described, for instance, in HSCD supra, pages 21 and 22, with regard to its use for loading pulses $$\frac{Jk}{2}$$

into the vertical loops 162a to 162u of matrix register 161, may equally be used for loading scanning pulses into the diagonal loops 163a to 163k, if the shifting, i. e. triggering and extinction of the various stages of the ring counter, is effected by a pulse sequence which is synchronized with the movement of the type set carrier relative to the printing surface. This pulse sequence thus takes the place of the register column loading pulses $\delta$ triggering the ring counter stages in the aforesaid Figure 7 of my copending application supra.

A pulse sequence of the kind required for the operation of this ring counter may be derived from either a servo-motor used for effecting the aforesaid relative movement of type set carrier and printing surface, or from a collector means associated with such a motor, which is, for instance, illustrated in Figure 24 and designated there by reference numeral 256.

It is also possible to use the switching pulses of the line shifting arrangement described above and comprising parts 175 to 177, which are supplied in a conventional manner from an electromechanical or electronic vibrator (Figure 8) for shifting the aforesaid ring counter.

*Control system of the printing apparatus*

Figures 9, 9a and 10 illustrate the control relay system for the printing apparatus according to the invention, to which reference is made in my copending application supra.

The relays used in this system are preferably electromechanical relays of the kind described, for instance, in HSCD supra, pages 35-37.

Figure 9a illustrates a loading device for the vertical loops (or columns) of a storage unit of the type illustrated in Figure 10. This loading device itself is described in detail in my copending application supra. It contains an electromechanical relay A, which comprises an energizable coil $a_0$ and a number of armatures $a_1$ and $a_2$, and a ring counter arrangement RC which comprises a plurality of thyratrons ignitable in successive order. Upon ignition of the last thyratron T in ring counter RC, which corresponds to the end of the storage process in one of matrix registers I or II (Figure 10), the coil $a_0$ of relay A is energized. Consequently, armatures $a_1$ and $a_2$ are attracted. Thereby armature $a_1$ breaks contact and extinguishes the thyratrons in ring counter arrangement RC. At the same time it causes the emission of a command pulse $\eta$ "storage completed!"

These functional steps have been described in detail in my copending application supra, but it will be understood that any loading device for the columns of a storage register must be capable of emitting such a pulse $\eta$ reporting that storage of a line of information is complete, i. e. that the register is full.

In Figure 9 there are shown a plurality of further relays B, C, E, F, G, H and J. Each of these relays comprises an energizable coil $b_0$, $c_0$, $e_0$, $f_0$, $g_0$, $h_0$ and $j_0$, and one or more armatures. Thus coil $b_0$ when energized actuates armatures $b_1$, $b_2$, $b_3$ and $b_4$; coil $c_0$ actuates armatures $c_1$, $c_2$, $c_3$ and $c_4$; coil $e_0$ actuates armature $e_1$; coil $f_0$ attracts or releases armatures $f_1$, $f_2$, and the multiple armatures $f_v$ for switching connecting lines simultaneously from the vertical loops of storage register I to the vertical loops of register II (Figure 10) and back, as well as multiple armatures $f_h$ establishing alternately connection to the horizontal loops of either register, and armatures $f_d$ connecting, alternately contactor terminals $23a$ to $23k$ mentioned above with the diagonal loops of either register I or register II. Furthermore, coil $g_0$ which is provided with a delay winding $d_0$, actuates armatures $g_1$, $g_2$, $g_3$ and $g_4$; coil $h_0$ actuates armature $h_1$; and coil $j_0$ actuates armature $j_1$.

In Figure 9, there is further shown schematically the type carrier 111, the writing surface 112, means for emitting message pulse $\xi$ which reports, for instance, to a computing device, or to a command transfer system of the kind disclosed in my copending application supra, that the printing apparatus according to the invention, is "ready to start printing!"

These means comprise capacitors $181a$ and $181b$, resistors $182a$ and $182b$, and diodes $183a$ and $183b$. The operation of these means as armature $f_2$ is switched from contact with terminal $L_1$ to contact with terminal $L_2$ and back, will be explained hereinafter.

Type set carrier 111 is provided with a contactor $46a$ adapted for operating a switch 46, for instance, of a known mechanical switch type, and with a contact rail $47a$ operating a switch 47 similar in type to switch 46. A servo-motor 184 acts upon contact rail $47a$ in a manner to be described further below and thereby causes the type set carrier 111 to move either to the right or to the left as indicated by arrows $184a$ and $184b$, depending on which of the two relays H or J causes its armature $h_1$ or $j_1$ to close the circuit supplying power to motor 184.

In the position illustrated in Figure 9, type set carrier 111 is in its left hand end position ready to start printing a text line by moving to the right. The contactor $46a$ of the carrier 111 is holding switch 46 in closed position.

If now the main switch M for turning the printing apparatus on and off is actuated, for instance, by hand, to close contact to the power line (not shown) to which it is connected, current will flow through switches M and 46 and through coil $b_0$ energizing the latter.

At the same time, since armature $f_2$ is in its left hand contact position resting on terminal $L_1$, capacitor $181a$ is charged as soon as main switch M is turned on, and, due to the potential drop across resistor 182, a positive pulse $\xi$ is sent out via diode 183.

This pulse $\xi$ may, for instance, be sent to a command transfer system of the kind described in my copending application supra, or to any other suitable device capable of acting upon the message conveyed by the aforesaid pulse $\xi$ that the printing apparatus according to the present invention is turned on through main switch M and that type set carrier 111 is in an end position from which it can move to print a text line.

The same message pulse $\xi$ would be sent out, if type set carrier 111 were in its right hand end position closing switch 47, while armature $f_2$ would be moved to its right hand rest position contacting terminal $L_2$.

Arrival of a pulse $\xi$ at the command transfer system of my copending application supra will cause the system to prepare, in a manner described in that application, storage of a new text line message in that storage register which has just been emptied by printing a previous message stored therein.

Let us now assume that, while the printing apparatus is still printing information stored in the register II shown in Figure 10, i. e. while the multiple armatures $f_d$ connect simultaneously all scanning terminals $23a$ to $23k$ with the diagonal loops of that register, and all armatures $f_v$ connect the vertical loops via lines $P_A$ to $P_U$ to the printing apparatus (Figure 6) in the manner illustrated in Figure 10, storage is taking place in register I.

This is illustrated in Figure 10 by a corresponding position of the left hand armatures of each pair of armatures $f_v$, connecting all storage lines $S_A$ to $S_U$ simultaneously to the vertical loops, and by the position of armatures $f_h$ connecting all storage lines $S_0$ to $S_q$ to the horizontal loops, of the same register I.

As coil $b_0$ is energized upon turning on main switch M and due to the fact that carrier 111 is in its left hand end position holding contact 46 closed, it actuates armature $b_1$, closing the same, but opens armatures $b_2$, $b_3$ and $b_4$.

While pulse $\xi$ has been sent out, printing will not start unless another pulse, namely the above-mentioned pulse $\eta$ is received.

This pulse $\eta$ arrives only when storage in register I is terminated. Thereupon, coil $a_0$ of relay A is energized, and while character $a_1$ is thereby opened to cut off the ring counter assembly RC and other functions may be performed as described in my copending application supra, which functions have no direct bearing on the operation of the printing apparatus according to the present invention, energization of coil $a_0$ also attracts armature $a_2$ which thus makes contact and brings about the energization of coil $g_0$ of relay G.

Actuation of relay G leads to the opening of armatures $g_3$ and $g_4$ and to closing of armatures $g_1$ and $g_2$. While closing the latter armature has no effect on relays E or H, since armatures $b_1$, $c_1$, and $g_3$ are open, the closing of $g_1$ leads to energisation of coil $f_0$ of relay F.

Thereby, armature coil $j_0$ of relay J is energized, and armature $f_1$ is closed, while armature $f_2$ is thrown from contact with terminal $L_1$ to contact with terminal $L_2$.

The aforesaid pulse $\xi$ is thus generated which announces that, simultaneously, relay F has shifted armatures $f_v$, $f_h$ and $f_d$ in the manner described above. Only following this shifting step can new storage from one register and printing from the other register begin.

The aforesaid energisation of relay J causes armature $j_1$ to close and to set motor 184 in motion which motor moves carrier 111 to the right in Figure 9.

Thereby contact 46 is interrupted and relay B deenergized. Before, however, considering the consequences of the deenergisation of coil $b_0$, there shall be described the further functions of relay F.

When this relay F is energized, it attracts armature $f_1$ as just described, but also shifts all armatures $f_d$ (Figure 10) so that the scanning contactors $23a$ to $23k$ are now connected to the diagonal loops of register I, which loops are then scanned during the ensuing movement to the right of type set carrier 111. A scanning current $J_k$ sent through these diagonal loops causes the printing of the information stored in register I, since the vertical loops of that register have now been connected to the lines $P_A$ to $P_U$ by a corresponding shifting of armature pairs $f_v$ concurrently with the shift of armatures $f_d$.

Furthermore, energisation of relay F has also shifted armatures $f_h$ to connect the storage lines $S_0$ to $S_9$ to the horizontal loops of storage register II.

Consequently, the typing process now comprises printing from register I and storage of new information in register II.

Returning now to relay B, deenergisation of coil $b_0$ causes armature $b_1$ to open, while $b_2$, $b_3$ and $b_4$ close, i. e. return to their initial position. Owing to the delay winding $d_0$, relay G remains energized for a short while, even after relay A has become deenergized and armature $a_2$ has opened. Then, however, as relay G falls off, $g_1$ and $g_2$ open, while $g_3$ and $g_4$ close.

Nevertheless, relays F and J remain energized via armatures $f_1$, $c_2$, $g_4$ and $c_4$, and motor 184 continues to move carrier 111 to the right.

When carrier 111 completes its movement to the right and thus terminates printing a text line from the register to which the shift of relay F acting on armatures $f_v$, $f_h$ and $f_d$ has it connected, its contact rail $47a$ closes contact 47 and thereby energizes coil $c_0$ of relay C.

Consequently, armature $c_1$ is closed and armatures $c_2$, $c_3$ and $c_4$ opened. However, relay F is still maintained energized, as long as relay G is inactive, $g_4$ and $f_1$ remaining closed. Thus, while printing from one register comes to an end, storage in the other register will still continue.

Oppositely, if storage in a register is terminated, the aforesaid pulse $\eta$ announces this fact and relays A and subsequently G are activated. Nevertheless, this will have no influence on the printing from the other register, for, while $g_4$ is opened, $c_2$ remains closed and consequently relay F remains energized via $f_1$ and $c_2$, and armatures $f_v$, $f_h$ and $f_d$ retain registers I and II (Figure 10) as connected.

It is thus immaterial which of both pulses $\eta$ and $\xi$ arrives first, both must have been received so that a shift from register I to II or vice versa can be effected through relay F operating armatures $f_v$, $f_h$ and $f_d$ can be effected.

If, however, carrier 111 has reached its right hand position, and relay C is activated causing the changes just described, and then storage is determinated and relays A and G are activated, energisation of $g_0$ causes closing of $g_1$ and $g_2$, and opening $g_3$ and $g_4$, and, since $b_1$, $c_2$ and $g_4$ are all open, coils $f_0$ and $j_0$ will be deenergized, armature $j_1$ is released, and power is cut off from the side of motor 184 driving carrier 111 to the right. At the same time, closing of $g_1$ and $c_1$ causes energisation of coil $e_0$ of relay E closing armature $e_1$, and of coil $h_0$ via $b_4$, activating relay H and causing armature $h_1$ of the same to close and cause motor 184 to serve carrier 111 to the left.

Deenergisation of relay F has also brought about a shift of armatures $f_v$, $f_h$ and $f_d$, so that printing now takes place from register II while new information is stored in register I.

As soon as the motor 184 starts moving carrier 111 away from its right hand end position to the left, switch 47 opens and coil $c_0$ of relay C is deenergized. Consequently, armature $c_1$ opens and $c_2$, $c_3$ and $c_4$ close. Due to delay winding $d_0$, relay G falls off slowly and $g_1$ and $g_2$ open, while $g_3$ and $g_4$ close. Nevertheless, coils $e_0$ and $h_0$ remain energized via $e_1$, $b_2$ and $g_3$, and $b_4$, and motor 184 continues to move carrier 111 to the left.

Only upon arrival of the carrier 111 at its left hand end position, i. e. after printing of another text line has been completed, does contactor 46a close switch 46, thus energizing coil $b_0$ of relay B and making the control system of the printing apparatus ready for printing yet another line upon receipt of another pulse $\eta$.

The steps of the printing and storing operations are then repeated in the same manner as described above.

Figure 11:
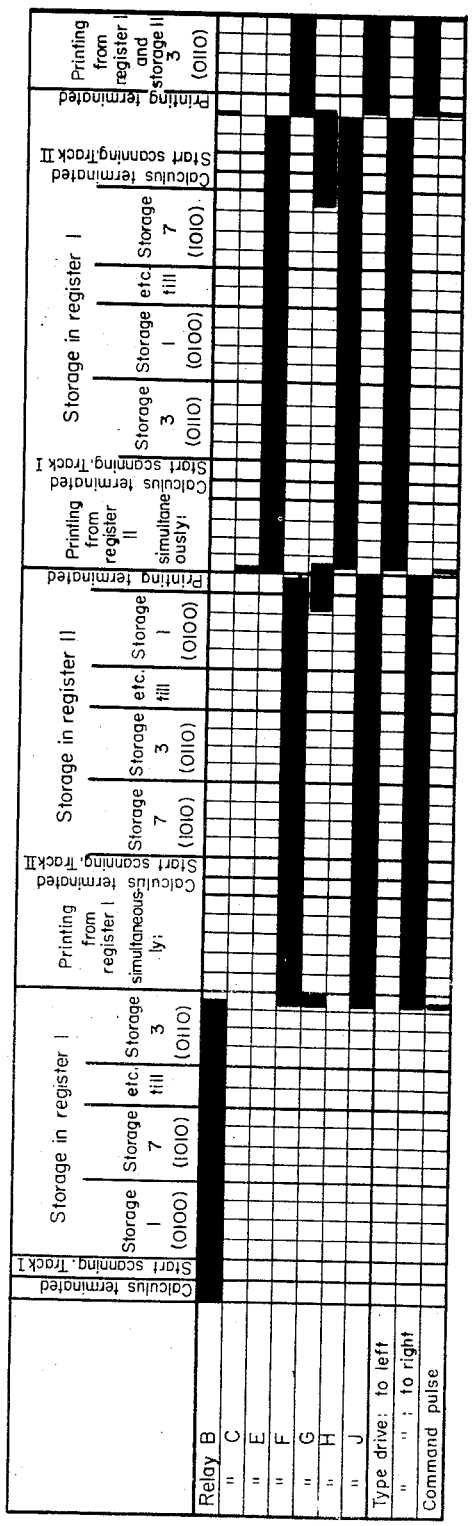
Figure 11 shows, by way of example, a pulse plan illustrating the functioning of the printing apparatus according to the invention.

Figure 11 illustrates in diagrammatical form the parallel operation of the several relays A to J in the control system of the printing apparatus, black spaces indicating energized state of a relay.

*Character type actuating means*

In Figures 12 to 21, there are illustrated various embodiments of type actuating means for use with the printing apparatus according to the invention.

Figures 12 to 16 show various embodiments of type arrangements and actuating means for the types, which are suitable for use with a drum-shaped type set carrier, according to the invention, such as illustrated, for instance, in Figure 8. Figures 17 to 20 show type arrangements and actuating means therefor for use in a straight-bar type set carrier according to the invention as illustrated, for instance, schematically in Figures 2 and 6, and more in detail in Figures 22 to 29.

Figure 12:
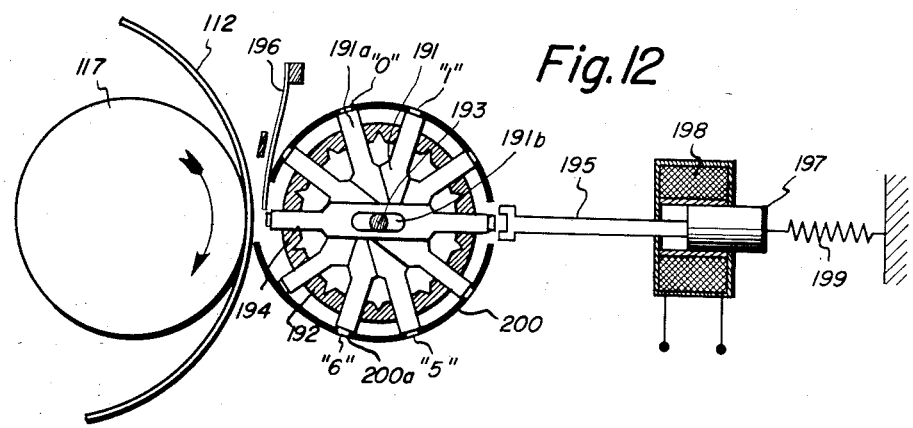
Figure 12 shows an arrangement of the types in the wall of the cylinder illustrated in Figure 8, and a guiding apron of the type resetting mechanism.
Figure 13:
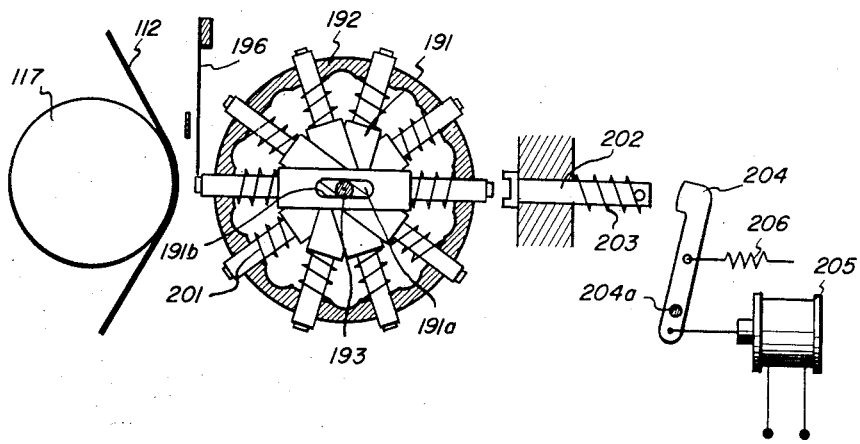
Figure 13 shows an arrangement of the types in the wall of the cylinder illustrated in Figure 8, in which arrangement springs are provided for resetting the types.

The embodiment of a type arrangement and type actuating means therefor, as it is shown in Figure 12, is suitable for use with a type set carrier drum of the type illustrated in Figure 8; it comprises ten parallel rows or lines of types. The ten types in each ring about the drum are arranged in the sequence of "0," "1," "2" and so on till "9," as illustrated in Figure 8.

Character types are mounted in pairs on opposite ends of bar- or strip-shaped steel laminations 191, so that, for instance, "0" and "5" are mounted on opposite ends of a lamination 191 in special type holder 191a provided at each end thereof, "1" and "6" are mounted on another lamination 191, "2" and "7" on yet another one, "3" and "8" on another, and finally "4" and "9" on yet another one.

These laminations are arranged to pass diametrically through the center of the hollow cylinder 192 constituting the type carrier drum, and have both their type carrying ends protrude from the latter.

There is no difficulty in arranging the aforesaid five laminations beside each other so that they fit into the width of a single character type of 2.6 millimeters. Each lamination may have a width, in axial direction of drum cylinder 192, of at least 0.5 millimeters.

If the laminations are built from a material of very high strength such as special alloyed steels, the width of each lamination may be as little as 0.2 millimeters, which would permit to house 13 laminations in the aforesaid space of 2.6 millimeters, i. e. 26 letter characters could be mounted on the ends of these thirteen laminations.

The front view of a type-bearing ring about the type set carrier drum 192, given in Figure 16, shows how the laminations 191 are arranged side by side with the type holders 191a attached, where necessary at a lateral displacement to fit them into the ring area.

Starting from a given ring 192a (Figure 8) to the left on drum 192, the ring 192b next adjacent ring 192a to the right thereof bears type characters designating numbers which are bigger by one than the neighboring numbers on ring 192a in the same character line set. The characters in the next following ring 192c are always by one unit bigger than those of the ring 192b to the left of ring 192c, and so on.

Thus, in the same character line set, "3" on ring 192c is to the right of "2" on ring 192b, which "2," in turn, is to the right of "1" on ring 191b.

The laminations 191 have elongated holes 191b through which the drum shaft 193 is passing. The type-bearing type holder 191a at each end of a lamination passes through a slot 194 in the cylindrical wall to the outside of the drum. The laminations are easily displaceable in radial direction relative to the shaft 193. Each lamination can, therefore, be displaced by the stroke of a hammer 195 against the end thereof which is facing away from the writing surface so that the other end strikes against the writing surface and prints thereon the type character borne on that end.

The hammer end striking against the one end of a lamination is recessed in such a manner, that it does not hit upon the character borne on that lamination end, but only against the margin of the type or type holder surrounding the character.

A stroke of hammer 195 against the lamination 191 may be brought about, for instance, by means of electromagnetic means comprising an armature 197 which causes movement of the hammer 195 against the action of return spring 199, when the magnetic coil 198 is energized.

A damping spring 196 is provided at the end of the lamination 195 facing the paper surface 112, which spring 196 engages the front end of the lamination during the forward stroke of the latter toward the paper surface, and prevents that a type hits the paper more than once during a stroke, and is withdrawn from the paper without vibrational shock.

During the rotation of the drum, aligning a new axially extending type row on the drum cylinder with the text line on the paper, thereby bringing this row of types into printing position with the rearward ends of the laminations 191 on which they are mounted, facing the hammers 195, the laminations are held in a middle position and brought to face the hammers at the proper distance therefrom, by means of a curved guiding shield 200 which is provided with slots 200a for the types proper but narrow enough to cause the margins of the type holders surrounding the types to rest against the peripheral margins of the slots 200a.

In another embodiment of the type arrangement and type actuating means, according to the invention, the laminations 191 are retained in their central rest position by means of springs 201 mounted about the laminations inside the cylinder wall of drum 192 and resting with one end thereagainst and with their other end against enlarged central portion 191b of lamination 191. No special guide shield is required in this instance.

The stroke against the lamination end is carried out, in this embodiment, by means of a pusher 202 which is retained in rest position by retracting springs 203. Each pusher 202 is in turn struck by a hammer 204 pivotally mounted at 204a which is actuated by an electro-magnet 205 and returned to its rest position by a retractive spring 206.

Yet another embodiment is illustrated in Figure 14. This embodiment also comprises a drum-shaped type set carrier through the wall 192c of which there are provided passages 192d in which type carrying rods 211 are mounted displaceably in radial direction toward the drum central axis. The rods 211 carry each one type only on their outer end. Springs 212 and 216 provided inside and outside the wall 192c respectively about the rods 211 tend to hold them in a centered rest position.

The rods in a circle about the drum are arranged aligned with each other in opposite portions of wall 192c to form cooperating pairs, for instance, pair 211A, pair 211B etc.

In the interior of the drum, a stroke transmitting push rod 217 is housed displaceably in radial direction in a stationary guiding block 219. Push rod 219 is held in central position relative to block 219 by means of compression springs 218 on both sides thereof.

The hammer arrangement is the same as in the preceding arrangement.

When a type carrying rod 211B on the side of the drum facing away from the writing surface 112 is hit by hammer 204, it is pushed into the interior of drum 211 and transmits the stroke to push rod 219 which in turn transmits it to the opposite type carrying rod 211B which is thus caused to print on the surface 112 which is supported on the paper moving cylinder 117.

Upon rotation of the drum, which will bring a certain number of the type rod pairs of the same two type rows as rod pair 211A into alignment with a corresponding number of push rods 217, the next following text line can be printed in a similar manner.

A still further embodiment of a drum-shaped type set carrier is illustrated in Figure 15. The arrangement of type carrying rods 211 in the drum wall 192c is identical with that in Figure 14. The type rods 211 are in retracted position under the effect of springs 212. The hammers 214 are arranged in a row being mounted pivotally on shaft 213 in the interior of drum 192 and are operated from electromagnetic means 215 which are schematically shown. These electromagnetic means 215 are actuated by control from a storage register as illustrated in Figure 6. This embodiment is particularly suited for printing mixed letter and cipher texts, since it is possible to arrange all necessary character types in the various type set rows of the drum.

Figure 16 shows in front view an individual ring or circle of types, a plurality of which are arranged beside each other to form a cylindrical drum surface as shown in Figure 8. The arrangement of the type carrying laminations in each circle has already been described.

In the next following Figures 17 to 20 there shall be described a number of embodiments of a type arrangement and actuating means therefor as used with a straight bar type set carrier 111. While Figure 17 shows a top view of the type set carrier, Figure 18 shows a partially sectional lateral view. The type carriers 231 can be arranged in the type set carrier 111 to form a set with the types facing the printing surface 111. The type carriers 231 supply mutual guidance to each other along their entire longitudinal surfaces in contact with one another. Or, as is shown in Figure 19, they can be guided in individual slots 111s provided in the front wall 111t and the back wall 111u of type set carrier 111. In the latter arrangement the tolerances between the types depending on their mutual location can be more exactly determined and friction between the types during the operation of one or the other type can be reduced.

In the embodiment of the type actuating means shown in Figures 17 and 18 electromagnetic means 232 operate hammers 233 which are pivotally mounted on shaft 233a and are held in retracted position by means of spring 235. As soon as one of the magnets 232 is energized it swings hammer 233 to swing about shaft 233a overpowering the retractive form of spring 235, and causes the hammer to hit against the rearward end 231u of a type carrier 231 which is held in rest position by means of a spring 234. The stroke of hammer 233 overcomes the force of spring 234 and flings carrier 231 forward against the writing surface 112 which is supported on cylinder 117. Repeated hitting of the writing surface by the type 231t is prevented by a damping spring 236. This spring also ensures a quick withdrawal of the type from the paper and assists the retractive action of spring 234.

As is shown in figure A the electro-magnets 232 may be staggered in fours so that at a given type width of 2.6 millimeters it is possible to arrange without difficulties magnets having a width of 10 millimeters, in a compact construction.

Figure 20 illustrates a different embodiment of the type actuating means to be used with the same type arrangement as in Figures 16 to 19. However, the type carriers 231 which are in general arranged in the same manner as in the preceding Figures 17 to 19 are provided at their rearward end 231u with a downwardly directed projection 231a. The bar-shaped carriers 231 are propelled forward against the writing surface 112 when struck by hammers 237 which are loosely supported at their lower end 237a on return hammers 239 by means of a strap 238 rigidly mounted at the aforesaid lower end 237a on hammer 237 forming a determined angle therewith and resting, with its curved portion 238a on a thorn 239b provided at the side facing away from hammer 237 on hammer 239. The latter is pivotally mounted on shaft 239a.

When electromagnet 232 attracts the lower end 237a of hammer 237 it causes the head 237b of the latter to hit against the rearward end 231u of bar-shaped type set carrier 231. As, however, the central portion of hammer 237 abuts stop 240 and electromagnet 232 continues to attract the lower end 237a of hammer 237, it attracts at the same time hammer 239 via strap 238 resting on thorn 239b, and causes hammer 239 to be flung pivoting against shaft 239a and hitting with its head 239c against the rearward projection 231a, flinging the same backward away from printing surface 112, thereby accelerating the withdrawal of the type set carrier 231, which withdrawal is not impeded during the important initial period of the return movement by any contact with hammer 237, since the latter has been stopped by 240. During the last portion of its return movement, carrier 231 may assist in pushing hammer 237 in its starting position illustrated in Figure 20 into which starting position both hammers 239 and 237 also drop under their own weight.

This last described arrangement of the type carrying and actuating means permits to provide for a practically momentary contact time between the type and the writing surface that it becomes possible under certain conditions to move the type set carrier 111 continuously instead of step by step past the writing surface 111 without running the danger of causing an undue deterioration of the aspect of the printed character.

Another embodiment of the printing apparatus according to the invention is illustrated in Figure 21. This embodiment comprises a straight bar type set carrier 242 which is horizontally displaceable in parallel to the text lines to be printed on writing surface 112, and corresponds in this respect to the previous described type set carriers 111 and 192. However, in contrast to the embodiments shown in Figures 17 to 20, the type carriers, which are bar-shaped in the aforesaid embodiments, are here provided as double arm levers 241 which are pivotally mounted adjacent each other on a shaft 242a which is disposed longitudinal in the type set carrier 242.

The type carrying levers 241 are provided at their upper end 241c with type holders 241d holding the character types 241t. Levers 241 having their lower arm 241a extend from shaft 242a in rearward direction alternate on that shaft with levers 241 having their lower arm 241b extend in forward direction. Both kind of levers 241 are held in rest position by retracting springs 243 mounted with their free end on a rail 242b of type set carrier 242.

Electromagnetic means 232 serve to actuate hammers 244 and 245 which are urged away from the lower arms 241b and 241a respectively by means of springs 244a and 244b. Hammers 244 are rigidly attached to the cores 232c of electromagnets 232, and are adapted to strike against the upper rim of lever arm 241b flinging the corresponding lever head (not shown, since behind lever head 241c) against the writing surface 112. Hammers 245 are indirectly connected to electromagnetic means 232 and strike each against the lower rim of a lever arm 241a, thereby swivelling a lever 241 about shaft 242a and causing character type 241t to hit against the writing surface 112.

Of course, instead of providing the angular arms 241a and 241b, lever 241 may also extend straight downward from shaft 241a, and hammers 244 and 245 could be correspondingly arranged to hit against the end of lever 241 on the opposite side of shaft 241a away from lever head 241c.

*Constuctions for different kinds of relative movements between type set carrier and printing surface*

As has been explained herein before, the relative movement between the type set carrier of a printing apparatus according to my invention and the printing surface which may, for instance, be a paper web borne on the cylinder of a typewriter or a counting machine, may be carried out by a lateral displacement of the type set carrier in the direction of the axis of the paper cylinder, during which displacement the cylinder remains stationary, or the paper cylinder may be displaced in the direction of the text line to be printed parallel to the stationary type set carrier. Embodiments covering both constructional solutions shall be described hereinafter in connection with Figures 22 to 29.

In the embodiment illustrated in Figure 22, the paper cylinder 117 is arranged stationary in the printing apparatus and, for instance, mounted rotatably in standards 117s. The cylinder is provided with the conventional mechanism (not shown) for feeding printing paper to the cylinder. Facing the latter, the straight bar type set carrier 111 is arranged for displacement toward the left and the right alternately, in the direction of a text line in parallel with the central cylinder axis. The step by step advance movement of the type set carrier 111 is effected by stepping switch means shifting magnet 251, the armature 252 of which bears a step by step advance pawl 252a which engages in a rack 253 rigidly connected to the type set carrier 111.

A similar magnet 254 whose armature 259 bars an advancing pawl 259a which engages in a second toothed rack (not visible) on the type set carrier in parallel to rack 253, serves for advancing the carrier 111 in opposite direction. The type actuating arrangement comprises a number of hammers 255, each of which corresponds to one character position in the text line to be printed on the printing paper (not shown), the number of hammers being equal to the number of character positions in the line. Magnets 232 are provided for actuating the hammers in the manner described above in detail.

While, in the aforegoing embodiment, the paper cylinder is stationary and the type set carrier displaceable, Figure 23 illustrates a printing apparatus according to the invention, in which the same ratchet and advancing pawl means 251 to 259 are provided for displacing the support 117t bearing the paper cylinder 117 rotatably mounted in its standards 117s which are, in this embodiment, mounted rigidly on support 117t. While the type set carrier 111s is stationary, the entire type actuating assembly comprising parts 232 and 255 and all subordinated parts as described in connection with Figures 17 to 20, is mounted on a supporting frame 255s which in turn is also rigidly connected to the displaceable support 117t. The hammers 255 now strike the rear ends of type bars 231 as they pass there in their lateral step by step movement. Again the number of hammers corresponds to the number of character positions (including letters, ciphers, punctuation signs and blanks) to be contained in one text line to be printed.

If the type contact with the printing surface is of exceptionally short duration, i. e. almost instantaneous, it becomes possible to provide for a continuous instead of a step by step displacement of the moving member in the printing apparatus according to the invention. Thus, Figure 24 illustrates an embodiment in which the paper cylinder 117 is stationary as in the embodiment of Figure 22, while the type set carrier 111 is advanced continuously in either direction under the action of a servomotor 256 driving a worm gear 257 that engages a toothed rack 258 rigidly connected to the type set carrier 111. In this instance, only one rack is required for movement in either direction. The type actuating means are preferably those illustrated in Figures 17–21.

The switching of the motor from rotation in one sense to that of opposite sense is effected, for instance, by a control switch $h_1$ and $i_1$, as disclosed in connection with Figure 9 of the drawings.

Figure 25 illustrates the opposite kind of embodiment in which type set carrier 111 is held stationary, being mounted on the apparatus frame indicated at 400. The arrangement of all parts is the same as in Figure 23, however, the sole rack 258 engages a worm gear 257 driven in either sense of rotation by a servomotor 256, as is the case in Figure 24.

Finally, a particularly rapid printing operation is possible with a printing apparatus according to my invention in which a continuous relative displacement of type set carrier and printing surface in the direction in which the text line to be printed extends, is superimposed on an oscillatory displacement of one of the two aforesaid members.

Figure 26:
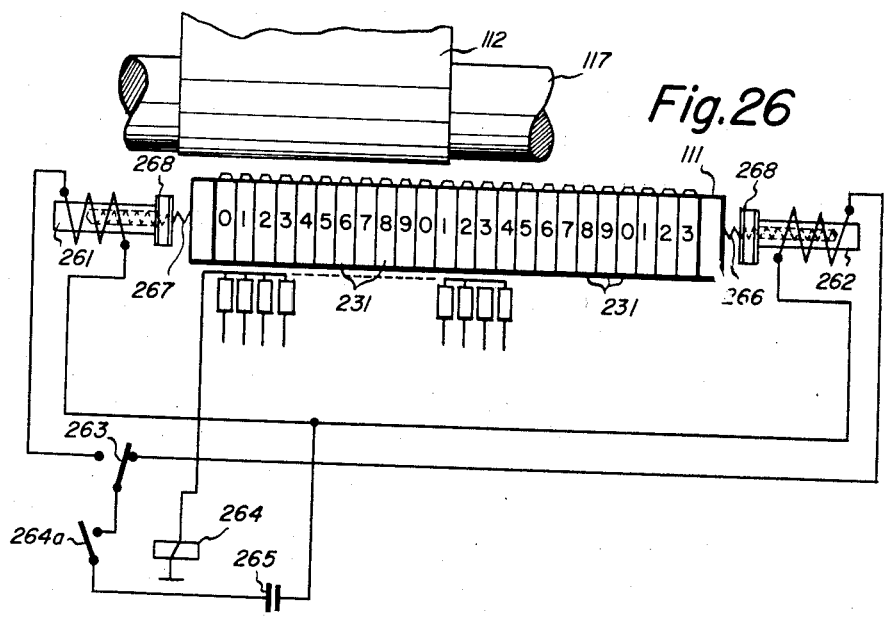
Figure 26 illustrates an arrangement, in a schematical top view, of a type set carrier provided with means for imparting to the same an oscillatory motion in the direction of the longitudinal extension of the carrier and a printing surface adapted for continuous longitudinal displacement thereof.

This combination of both movements is applied in the embodiments illustrated in Figures 26 to 28.

By superimposing an oscillatory movement on a continuously translatory movement, paper synchronization of the type hammer strokes with the oscillations of one of the aforesaid two members of the printing setup reduces the relative movement between type set carrier and printing surface in a series of determined instances to zero, and it is in this instance that the type actuating means must cause a type to print a character on the printing surface. If this synchronization is achieved, even a rapid displacement, for instance, of the paper cylinder, makes possible a clear print free from any smearing effect.

The aforesaid superimposed oscillatory motion may, for instance, be generated in an oscillatory drive acting on a stationary type set carrier as illustrated in Figure 26. The oscillatory drive comprises primarily two electromagnets 261 and 262 which are preselected with the aid of a double terminal switch 263 which is actuated by the paper cylinder carriage (not shown), preselection being made according to the direction of movement of the paper cylinder 117. As soon as one or several of the type actuating magnets 20 (see Figure 6) are energized, the coil 264 of a relay is energized and attacks relay armature 264a, thereby closing the circuit of electric energy source 265 via the preselected one of the two magnets 261 or 262. By appropriately choosing the time constant of this circuit, it can be achieved that due to the acceleration received from one of the two magnets 261 and 262, the type set carrier 111 has a velocity, at the moment of a type 231 hitting the writing surface 112, in the direction of displacement of the paper cylinder 117 carrying that writing surface, which is identical to the continuous velocity of the paper cylinder.

The very small longitudinal displacement carried out by the type set carrier 111 in each oscillatory phase, is dampened by compression springs 266 and 267. In order to limit the amplitude of the oscillations of carrier 111 under all circumstances, resilient stop means may be provided on either side of the type set carrier 111 which may be formed, for instance, by damping rings 268 placed about the magnet poles of electromagnets 261, 262.

Figure 27 illustrates an embodiment in which a continuously moving type set carrier passes along a paper cylinder mounted in a vibratory supporting device 401 which is itself stationary in the apparatus frame 400. The vibratory device 272 comprises a magnet 271 excited by an alternating voltage, which magnet acts, for instance, by means of an armature connecting rod 402 on the supporting blade spring 272 in which the paper cylinder 117 is conventionally mounted at the end of its longitudinal axis. The magnet 271 then imparts oscillations in longitudinal direction to the cylinder 117.

The type set carrier 111 is arranged for displacement in longitudinal direction parallel to the cylinder 117, in the manner illustrated in Figures 22 and 24 and is adapted to be driven continuously back or forth as described in the latter figure.

Magnet 271 may either be excited by an alternating voltage generator whose frequency is synchronized with the type actuating intervals, or it may be excited by the net frequency, i. e. the frequency of the public electric network if the latter is synchronous with the type actuating periods, which will often be the case. Or the energisation of magnet 271 may be effected by a pulse switch generator 403 which is driven from the motor shaft 273 and comprises, as main elements, a cam 274 and a spring contactor 275. The latter connects the voltage source 276 periodically with the exciting coil of magnet 271 synchronously with the position of type set carrier 111 vis-a-vis a type character position in the text line to be printed, regardless of whether a type character is actually being printed or a blank is left in the text position.

In order to tune the resonance frequency of the vibratory system 401 as closely as possible to the exciting frequency of magnet 271, an adjustable weight 277 may be arranged on one of the blade supports 272.

The embodiment of a high speed printing apparatus according to the invention, illustrated in Figure 28, comprises a stationary paper cylinder supported in standards 404 rigidly mounted on the apparatus frame 400, and a type set carrier 411 which is displaceable laterally in a continuous movement and concurrently therewith excitable to carry out longitudinal oscillations superimposed on its general translatory movement. A worm gear drive 257/258 is provided similar to that shown in Figure 24, whereby the type set carrier 411 is moved parallel to the axis of cylinder 117, in either direction.

Between the driving motor 256 and worm gear shaft 257 there is arranged a differential gear transmission system 405.

The sense of rotation of worm gear 257 is reversed, at will, by switching the exciting voltage V from a clutch 281 to a second clutch 282, while switching can be effected, for instance, by the actuation of relay armatures $h_1$ and $i_1$, as described in connection with Figure 9 of the drawings.

However, in this embodiment type set carrier 411 is not rigidly connected to toothed rack 258, but is supported between magnet yokes 283 and 284, in which carrier 411 is held with the aid of interposed elastic means such as rubber blocks 290, while yokes 283 and 284 are mounted on a carriage 406 to which rack 258 is rigidly attached.

Type set carrier 411 is thus enabled to carry out limited longitudinal oscillations between rubber blocks 290. Magnet yokes 283 and 284 protrude with their rectangularly offset leg portions 283a and 284 by a short distance beyond the top surface of carrier 411. Both the magnet yokes 283 and 284 and the carrier 411 are made of magnetizable material, such as iron. Air gaps 407 and 408 permit the magnetic flux from yokes 283 and 284 respectively to the type set carrier 411. In a similar manner, the lower yoke legs 283b and 284b extend below at least the marginal portions of a magnetizable bottom block 411a of the type set carrier 411, forming air gaps 412 and 413 therewith. Lower legs 283b and 284b are each surrounded by electromagnetic coils 285 and 286.

When current flowing through the windings of coil 285 excites the latter, the circuit of magnetic flow is, for instance, closed from yoke 283 through leg 283a, air gap 407, type set carrier 411, bottom blocks 411a, air gap 412 and leg 283b back to yoke 283.

Due to the magnetic flow, type set carrier 411 is attracted by a small distance to the left. A small displacement to the right occurs in an analogous manner when coil 286 is excited.

The alternating excitation of coils 285 an 286 may, for instance, be brought about by an alternating voltage which feeds power to the synchronous motor 256 and the half waves of which voltage arrive at the windings alternatingly by way of special rectifying circuits 287 and 288 known per se. Of course, excitation may again be achieved by special switching means which are synchronized with the type actuating periods.

Figure 29:
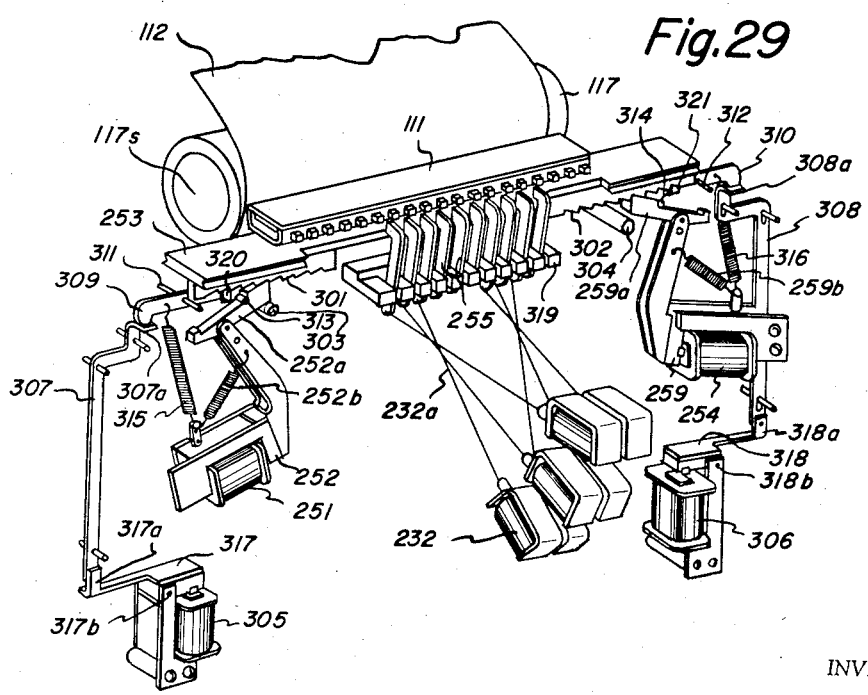
Figure 29 is a perspective, schematic illustration of a type set carrier comprising driving and stop means for step by step displacement in either direction of the longitudinal extension of the carrier.

Finally, Figure 29 discloses in greater detail a preferred embodiment of the printing apparatus according to the invention, which comprises a straight bar carrier 111 adapted for step by step rectilinear displacement in either direction parallel with the text line to be printed on the printing surface 112, for instance, a paper web which is supported on, and fed in line by line stepwise advance by the stationary cylinder 117. Cylinder 117 is rotatably mounted on shaft 117s which rests in standards (not shown).

Type set carrier 111 is advanced in a similar manner as illustrated in Figure 22, by means of a supporting bar 253 which is rigidly connected to the carrier 111. Bar 253 and together therewith type set carrier 111 are moved step by step to the left or to the right. This is effected by a corresponding energisation of electromagnet 251 or 254 respectively, which operate armatures 252 and 259 and advance pawls 252a and 259a connected respectively thereto, pawl 252a engaging a rack 301 which is rigidly mounted on bar 253 for the advance of type set carrier 111 to the right in Figure 29. Pawl 259a is then disengaged from rack 302, rigidly connected to opposite half of bar 253. When pawl 259a engages rack 302, while pawl 252a is disengaged from rack 301, the carrier 111 carries out its return movement to the left in Figure 29.

The pawl 252a, for instance, is advanced, when magnet 251 attracts armature 252, until it abuts against the limiting pin 303. Thus, it moves carrier 111 forward by a distance determined by that pin 303.

The pawl 252a is then returned to its initial position under the action of compression springs 252b, after magnet 251 has been deenergized.

In order to prevent that the carrier 111 is withdrawn together with the pawl 252a during the return movement of the latter, a releasing pawl 320, which is fastened to a lever 309, engages rack 301 and thus retains carrier 111 in the position to which it has been advanced by the forward movement (to the right) of pawl 252a.

During the forward movement of carrier 111 to the right, pawl 259 as well as releasing pawl 321, which has the same function as pawl 320, but at the right end of the carrier 111, are disengaged from rack 302 in the following manner: An auxiliary electromagnet 306 is energized and attracts an armature 318 which lifts angular bar 308 and thereby swivels double arm lever 310 about its fulcrum 312. Thereby pawl 321 moves downwardly out of engagement with rack 302, while pin 314 which is also mounted on lever 310, urges pawl 259a downwardly, thus completely setting free rack 302.

In an analogous manner, during the movement of carrier 111 to the left, pawls 252a and 320 are disengaged in the following manner: Magnet 305 is energized and attracts armature 317 which raises angle bar 307 and thereby swivels double arm lever 309 about its pivot 311, whereby pawl 320 is disengaged from rack 301. Simultaneously pin 313 on lever 309 urges pawl 252a downwardly and disengages the same from rack 301, thereby setting the same free for displacement to the left.

It is, therefore, necessary, that disengaging magnet 306 on the right side of carrier 111 is energized during the actuation of advance magnet 251, causing movement of the carrier to the right, while, during the movement of the carrier 111 in opposite direction, disengaging magnet 305 must be energized, while magnet 254 actuates the advance mechanism.

While armatures 252 and 259 are returned to their initial positions by means of return springs 252b and 259b after energisation of magnets 251 and 254 respectively has ceased, the return movements of armatures 317 or 318 is effected by return springs 315 and 316 respectively. When this happens, double levers 309 or 310 act upon angle pieces 307a or 308a of bars 307 or 308 respectively, and together therewith on lever arms 317a or 318a of armatures 317 or 318, which latter armatures are rotatable about shafts 317b and 318b respectively.

A plurality of hammers 255 are mounted in their stationary hammer support 319 opposite that side of the type set carrier 111 which faces the writing surface. Hammers 255 are actuated, in the same manner, as described hereinbefore, from actuating magnets 232 which are connected by steel wires 319 to the lower ends of hammers 255.

The embodiment illustrated in Figure 28 is the preferred embodiment of a printing apparatus according to my invention.

It will be understood that this invention is susceptible to modification in order to adapt it to different usages and conditions and, accordingly, it is desired to comprehend such modifications within this invention as may fall within the scope of the appended claims.

I claim:

1. In a printing apparatus controlled by a storage unit having at least one register, and comprising rows of character bearing types and a printing surface, supporting means for said printing surface, and means for effecting a relative displacement between said rows of character types and said printing surface line by line with regard to each other, selection of the types to be printed being made successively in each line with the aid of a relative displacement between said type rows and said printing surface at right angle to said line by line displacement, the combination of at least one type set carrier bearing at least one complete set of all character types in a random sequel, which types form a substantially straight lined row in a direction parallel to the text lines to be printed, drive means for relative displacement between said supporting means and said type set carrier with regard to each other, and a group of type actuating means in a determined position relative to said supporting means and adapted to actuate, dependent upon control by said storage unit, one single type in certain positions of said type set carrier confronting said printing surface, several types simultaneously in certain other positions, and no types at all in yet other positions of said type set carrier relative to said printing surface, so that a complete text line is printed in one course of said type set carrier and printing surface past each other independently of the direction of relative travel of said carrier and surface, during which course the length of relative travel is maximally equal to the product of the number of one less than all the different character types multiplied by the type spacing in the type row.

2. In a printing apparatus controlled by a storage unit and comprising a row of character bearing types and a printing surface, selection of the types to be printed being effected with the aid of a relative displacement between said type row and said printing surface, the combination of a type set carrier of longitudinally substantially straight-lined extension, which longitudinal extension of said type set carrier is parallel to the text lines to be printed on said printing surface, at least one complete set of all character types required for printing in random order, said type set being disposed in a longitudinally extending row on said type set carrier, a printing surface, means for displacing said printing surface and said type set carrier relative to each other parallel to said text lines, and a group of type actuating means coordinated with said printing surface and adapted to actuate, dependent upon control by said storage unit, one single type in certain positions of said type set carrier confronting said printing surface, several types simultaneously in certain other positions, and no types at all in yet other positions of said type set carrier relative to said printing surface, so that a complete text line is printed in one course of said type set carrier and printing surface past each other independently of the direction of relative travel of said carrier and surface, during which course the length of relative travel is maximally equal to the product of the number of one less than all the different character types multiplied by the type spacing in the type row.

3. In a printing apparatus controlled by a storage unit having at least one register, and comprising rows of character bearing types and a printing surface, supporting means for effecting said printing surface, and means for a relative displacement between said rows of character types and said printing surface line by line with regard to each other, selection of the types to be printed being made successively in each line with the aid of a relative displacement between said type rows and said printing surface at right angle to said line by line displacement, the combination of several type set carriers in parallel arrangement, each bearing at least one complete set of character types in a random sequel, which types form a substantially straight lined row in a direction parallel to the text lines to be printed, each set of character types pertaining to a different character system such as ciphers, letters, symbols and the like, each of said type set carriers being adapted for printing a portion of the text line information stored in said register and pertaining to the character system of that carrier, first drive means for relative displacement between said supporting means and each of said type set carrier with regard to each other, and a group of type actuating means in a determined position relative to said supporting means, second drive means for displacing relatively to each other said type set carriers and said printing surface line by line and adapted to actuate, dependent upon control by said storage unit, one single type in certain positions of said type set carrier confronting said printing surface, several types simultaneously in certain other positions, and no types at all in yet other positions of said type set carrier relative to said printing surface, so that a complete text line is printed in one course of said type set carrier and printing surface past each other independently of the direction of relative travel of said carrier and surface, during which course the length of relative travel is maximally equal to the product of the number of one less than all the different character types multiplied by the type spacing in the type row.

4. The combination described in claim 1, comprising means for displacing said type set carrier in a continuous movement parallel to said text line relative to the stationary writing surface.

5. The combination described in claim 1, comprising means for displacing said writing surface in a continuous movement parallel to said text line relative to the stationary type set carrier.

6. The combination described in claim 1, comprising means for displacing said type set carrier in a step by step movement parallel to said text line relative to the stationary writing surface.

7. The combination described in claim 1, comprising means for displacing said writing surface in a step by step movement parallel to said text line relative to the stationary type set carrier.

8. The combination described in claim 1, wherein said type set carrier is a straight bar type frame displaceable step by step parallel to the text line and comprising a plurality of types slidingly arranged in said frame at right angle to the writing surface.

9. The combination described in claim 1, wherein said type set carrier is a straight bar type frame displaceable step by step parallel to the text line and comprising a shaft disposed longitudinally in said frame and a plurality of swivel levers bearing said character types and being mounted on said shaft in said type carrier frame.

10. The combination as described in claim 1, wherein said type set carrier is a drum having a cylinder surface, said combination further comprising a shaft on which said drum is rotatably mounted, several rows of character types having their characters stand upright side by side in each row, being arranged parallel to said shaft on said cylinder surface, each row comprising character types in a sequence which is displaced by one character relative to the next adjacent row on said cylinder surface, said second drive means effecting a rotation of said drum about said shaft, thereby causing types of all different characters to pass consecutively through a determined position facing said printing surface.

11. The combination as described in claim 10, wherein said second drive means effect a continuous rotation of said drum.

12. The combination as described in claim 10, wherein said second drive means effect a step by step rotation of said drum.

13. The combination as described in claim 1, further comprising a scanning device which is pre-set corresponding to said relative displacement between said type set carrier and said printing surface, and adapted for scanning said storage unit containing information to be printed in each of the successive positions of said type set carrier relative to said printing surface, when the corresponding character type is in position for engagement by said actuating means.

14. The combination as described in claim 1, further comprising a scanning device which is pre-set corresponding to said relative displacement between said type set carrier and said printing surface, and adapted for scanning alternately the registers of said storage unit containing information to be printed in each of the successive positions of said type set carrier relative to said printing surface, when the corresponding character type is in position for engagement by said actuating means.

15. The combination as described in claim 13, in which said scanning device is adapted to scan the registers of said storage unit, said storage registers comprising several parallelly arranged diagonal loops being used successively for scanning said registers, said diagonal loops comprising at least one position for each character value of character system used for printing, said scanning device comprising a current source for sending current through the diagonal loop being used temporarily for scanning.

16. In a printing apparatus of the kind described, the combination of a matrix register, diagonal loops therein, a source for current to be sent through said diagonal loops, two printing members being a printing surface, and a type set carrier, one of which members is adapted for movement past the other member in the direction in which the text lines to be printed on said printing surface extend, type actuating means and a scanning device for scanning said register and operating said actuating means according to the detected information comprising a contact rail, contact terminals on said rail and connected to said diagonal loops, and a contactor element slidably displaceable on said rail and adapted for movement synchronously with the movement of said movable printing member, current from said current source being sent successively through said diagonal loops as said contactor element makes contact with said terminals.

17. In a printing apparatus of the kind described, the combination of a matrix register, diagonal loops therein, a source for current to be sent through said diagonal loops, two printing members being a printing surface, and a type set carrier, one of which members is adapted for movement past the other member in the direction in which the text lines to be printed on said printing surface extend, type actuating means and a scanning device for scanning said register and operating said actuating means according to the detected information comprising a ring counter arrangement comprising several thyratron stages, to be fired and extinguished consecutively, a gate associated with each ring counter, and connected to said diagonal loops, and means for firing and extinguishing said ring counter stages synchronously with the movement of said movable printing member, current from said current source being sent successively through said diagonal loops as the corresponding thyratrons are fired.

18. In a printing apparatus of the kind described, the combination of a storage unit comprising two matrix registers, diagonal loops in each of said registers for scanning thereof, a source for current to be sent through said diagonal loops, two printing members being a printing surface, and a type set carrier, one of which members is adapted for movement past the other member in the direction in which the text lines to be printed on said printing surface extend, type actuating means and a scanning device for scanning said register and operating said actuating means according to the detected information, a system for loading decadic information into one of said registers, switch means for shifting connections from each of said registers alternately one to said loading system and the other to said type actuating means and scanning means.

19. In a printing apparatus of the kind described, the combination of a plurality of storage units, each of said units comprising two matrix registers, diagonal loops in each of said registers for scanning the same, a source for current to be sent through said diagonal loops, printing members comprising a printing surface and a plurality of type set carriers, each of which carriers is associated with one of said storage units, said printing surface on the one hand, and said plurality of type set carriers, on the other hand, being adapted for movement past each other in a direction parallel to the text lines to be printed on said printing surface, type actuating means, a scanning device for scanning said registers and operating said actuating means according to the detected information, means for bringing successively one after the other of said type set carriers into a position of cooperation with said type actuating means and said scanning device, a system for loading decadic information into one of the registers of each of said storage units, and switch means for shifting connections for each of said registers of the storage unit associated with the type set carrier in printing position alternately connecting one register to said information loading system, and the other register to said type actuating means and scanning means and vice versa.

20. The combination as described in claim 18 wherein said switch means comprise a pair of switches being operable upon said movable printing member reaching one of its two end positions of its traverse past the other printing member, and a plurality of interdependent electromagnetic relays.

21. The combination as described in claim 18, further comprising means for effecting a displacement of said type set carrier parallel to the text line to be printed on said printing surface, which means comprises a step by step advance mechanism.

22. The combination described in claim 28, wherein said type actuating means further comprise return hammers cooperating with said hammers and driven together with said hammers by said electromagnetic means, when the latter are energized, said type carrying bars being provided at their end contacted by said hammers with protrusions against which said return hammers hit under the effect of kinetic energy provided by the forward stroke of said hammers against said type carrying bar end.

23. In a printing apparatus of the kind described, the combination of two printing members being a printing surface, and at least one type set carrier, both members being of substantially straight lined extension in the direction in which a text line to be printed on said printing surface extends, drive means for moving one of said members past the other in a direction parallel to said text line alternatingly in a forward and a return course, while the other member remains stationary, type carrying means arranged in said type set carrier displaceable at right angle to said text line, type actuating means associated with said stationary printing member and actuating upon certain of said type carrying means in determined positions of said type set carrier and said printing surface relative to each other, and means for displacing said printing surface line by line at right angle to said displacement thereof parallel to the text lines, so that a first text line is printed on said printing surface during the forward course of the moving printing member past the stationary member, and the next following text line is printed parallel to said first text line during the return course of the moving member, in opposite direction, past the stationary member.

24. In a printing apparatus of the kind described, the combination of two printing members being a printing surface, and at least one type set carrier, both members being of substantially straight lined extension in the direction in which a text line to be printed on said printing surface extends, first drive means for moving one of said members past the other in a direction parallel to said text line, while the other member remains stationary, type carrying means arranged in said type set carrier displaceable at right angle to said text line, type actuating means associated with said stationary printing member and actuating upon certain of said type carrying means in determined positions of said type set carrier and said printing surface relative to each other, and second drive means imparting oscillatory displacements in both directions parallel to said text line, to the stationary one of said printing members during the relative displacement of the other member imparted by said first drive means, said oscillatory displacements being synchronized with the action of said type actuating means, so that the relative velocity of displacement between both printing members at the instant of said actuating means acting upon said type carrying means is zero.

25. The combination described in claim 24, wherein said second drive means comprise two electromagnets and two end position switches one at either end of the longitudinal path of travel of the movable printing member, said electromagnets being shifted by one of said end position switches upon arrival of said movable printing member in an end position, so that one of said electromagnets is energizable synchronously with the action of said type actuating means.

26. The combination described in claim 24, wherein said second drive means comprise two electromagnets, two end position switches one at either end of the longitudinal path of travel of the movable printing member, said electromagnets being shifted by one of said end position switches upon arrival of said movable printing member in an end position, so that one of said electromagnets is energizable synchronously with the action of said type actuating means, said type actuating means comprising type actuating electromagnets, and relay means associated with said electromagnets of said second drive means for exciting one of the latter and connected in series with said type actuating electromagnets, so that one of said electromagnets of the second drive means is energized in unison with the type actuating electromagnets.

27. The combination described in claim 24, wherein said second drive means comprise two electromagnets, two end position switches one at either end of the longitudinal path of travel of the movable printing member, said electromagnets being shifted by one of said end position switches upon arrival of said movable printing member in an end position, so that one of said electromagnets is energizable synchronously with the action of said type actuating means, said type actuating means comprising type actuating electromagnets, relay means associated with said electromagnets of said second drive means for exciting one of the latter and connected in series with said type actuating electromagnets, so that one of said electromagnets of the second drive means is energized in unison with the type actuating electromagnets, and a magnetic system energizable by the public electrical network having a determined net voltage and net frequency, said magnetic system causing said second drive means to generate in one of said printing members continuously vibrations directed in parallel to the text lines to be printed, wherein by means of synchronization of the pulses exciting said type actuating magnets with said net frequency, the action of the types on the printing surface is timed to occur at a certain phase ratio with the net voltage passing through zero.

28. In a printing apparatus of the kind described, the combination of type set carrier means comprising an elongated straight-bar type set frame, said frame being horizontally displaceable in parallel to a text line to be printed on a printing surface, type carrying bars being disposed adjacent each other in said frame and adapted for individual movement transverse to the longitudinal extension thereof, spring means for retaining said type carrying bars in a rest position in said frame, and type actuating means stationary in said apparatus and adapted for selectively moving at least one, at a time, of said type carrying bars in the aforesaid manner, so as to effect printing of said text line, said type actuating means comprising a shaft, a plurality of hammers pivotally mounted side by side on said shaft, energizable electromagnetic means associated with each hammer for swiveling the latter, said hammer hitting on one end of the corresponding type carrying bar when the electromagnetic means associated with that particular hammer are energized, and means for selectively energizing a determined number of said electromagnetic means in determined positions independently of the other electromagnetic means.

References Cited in the file of this patent

UNITED STATES PATENTS

| | | | |
|---|---|---|---|
| 996,993 | McCall | July 4, | 1911 |
| 1,731,614 | Etherton | Oct. 15, | 1929 |
| 2,692,551 | Potter | Oct. 26, | 1954 |
| 2,773,443 | Lambert | Dec. 11, | 1956 |
| 2,776,618 | Hartley | Jan. 8, | 1957 |
| 2,799,222 | Goloberg | July 16, | 1957 |
| 2,805,620 | Rosen | Sept. 20, | 1957 |
| 2,811,102 | Devol | Oct. 29, | 1957 |

UNITED STATES PATENT OFFICE

Certificate of Correction

Patent No. 2,874,634  February 24, 1959

Theo Hense

It is hereby certified that error appears in the printed specification of the above numbered patent requiring correction and that the said Letters Patent should read as corrected below.

Column 19, line 41, for "*Constuctions*" read —*Constructions*—; column 22, line 1, for "differential" read —reversible—.

Signed and sealed this 4th day of August 1959.

[SEAL]

Attest:
KARL H. AXLINE,
*Attesting Officer.*

ROBERT C. WATSON,
*Commissioner of Patents.*